US008494947B2

(12) United States Patent
Brady et al.

(10) Patent No.: US 8,494,947 B2
(45) Date of Patent: *Jul. 23, 2013

(54) METHOD AND SYSTEM FOR PROVIDING OPTION SPREAD INDICATIVE QUOTES

(71) Applicant: Chicago Mercantile Exchange Inc., Chicago, IL (US)

(72) Inventors: Neal Brady, Evanston, IL (US); Tom Paronis, New York, NY (US); Christopher S. Whittington, Streamwood, IL (US); Paul A. Schmid, Chicago, IL (US); Jon Dahl, Plainfield, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/646,133

(22) Filed: Oct. 5, 2012

(65) Prior Publication Data
US 2013/0030980 A1  Jan. 31, 2013

Related U.S. Application Data

(60) Division of application No. 12/505,946, filed on Jul. 20, 2009, now Pat. No. 8,306,902, which is a division of application No. 10/726,851, filed on Dec. 2, 2003, now Pat. No. 7,584,140, which is a continuation-in-part of application No. 10/685,907, filed on Oct. 15, 2003, now Pat. No. 7,197,483.

(60) Provisional application No. 60/418,982, filed on Oct. 15, 2002.

(51) Int. Cl.
*G06Q 40/00* (2012.01)
(52) U.S. Cl.
USPC .............................. 705/36 R; 705/35; 705/37

(58) Field of Classification Search
USPC .......................................... 705/35, 36 R, 37
See application file for complete search history.

(56) References Cited

U.S. PATENT DOCUMENTS

| 5,794,207 | A | 8/1998 | Walker et al. |
| 5,924,082 | A | 7/1999 | Silverman et al. |
| 5,950,176 | A | 9/1999 | Keiser et al. |
| 6,018,722 | A | 1/2000 | Ray et al. |
| 6,049,783 | A | 4/2000 | Segal et al. |
| 6,195,647 | B1 | 2/2001 | Martyn et al. |
| 6,236,972 | B1 | 5/2001 | Shkedy |
| 6,272,474 | B1 | 8/2001 | Garcia |
| 6,317,727 | B1 | 11/2001 | May |
| 6,321,212 | B1 | 11/2001 | Lange |

(Continued)

OTHER PUBLICATIONS

Barron's, Nov. 4, 1991, "Derivatives Drive New Network", Barron's, 71, 44, ABI/INFORM Global, pp. 36-37.

(Continued)

*Primary Examiner* — Lalita M Hamilton
(74) *Attorney, Agent, or Firm* — Lempia Summerfield Katz LLC

(57) ABSTRACT

A computer network and method for electronically trading combinations of derivatives. One preferred method of trading includes providing quotes information to a central server, and determining indicative quotes for combination trades, and providing the non-binding, indicative quotes to market participants (which typically includes subscribers, but may also include market makers). A participant may then submit an e-RFQ, which is a request for a binding quote for the combination of derivatives. Market Makers may then elect to submit a binding quote for the corresponding derivative combination. Market participants may then elect to enter a binding order.

20 Claims, 16 Drawing Sheets

U.S. PATENT DOCUMENTS

| | | | |
|---|---|---|---|
| 6,347,307 | B1 | 2/2002 | Sandhu et al. |
| 6,421,653 | B1 | 7/2002 | May |
| 6,505,174 | B1 | 1/2003 | Keiser et al. |
| 6,539,362 | B1 | 3/2003 | Patterson et al. |
| 6,618,707 | B1 | 9/2003 | Gary |
| 6,625,583 | B1 | 9/2003 | Silverman et al. |
| 7,340,430 | B2 | 3/2008 | Mulinder et al. |
| 2001/0032163 | A1 | 10/2001 | Fertik et al. |
| 2001/0034695 | A1 | 10/2001 | Wilkinson |
| 2001/0042036 | A1 | 11/2001 | Sanders |
| 2001/0044771 | A1 | 11/2001 | Usher et al. |
| 2002/0002530 | A1 | 1/2002 | May |
| 2002/0016760 | A1 | 2/2002 | Pathak |
| 2002/0069155 | A1 | 6/2002 | Nafeh et al. |
| 2002/0099651 | A1 | 7/2002 | May |
| 2002/0116317 | A1 | 8/2002 | May |
| 2002/0128955 | A1 | 9/2002 | Brady et al. |
| 2002/0138390 | A1 | 9/2002 | May |
| 2002/0156719 | A1 | 10/2002 | Finebaum et al. |
| 2002/0169703 | A1 | 11/2002 | Lutnick et al. |
| 2002/0174055 | A1 | 11/2002 | Dick et al. |
| 2003/0004853 | A1 | 1/2003 | Ram et al. |
| 2003/0023536 | A1 | 1/2003 | Hollerman et al. |
| 2003/0028476 | A1 | 2/2003 | Jenkins et al. |
| 2003/0033212 | A1 | 2/2003 | Sandhu et al. |
| 2003/0033240 | A1 | 2/2003 | Balson et al. |
| 2003/0061148 | A1 | 3/2003 | Alavian |
| 2003/0069836 | A1 | 4/2003 | Penney et al. |
| 2003/0083978 | A1 | 5/2003 | Brouwer |
| 2003/0093343 | A1 | 5/2003 | Huttenlocher et al. |
| 2003/0093360 | A1 | 5/2003 | May |
| 2003/0097328 | A1 | 5/2003 | Lundberg et al. |
| 2003/0101125 | A1 | 5/2003 | McGill et al. |
| 2003/0115128 | A1 | 6/2003 | Lange et al. |
| 2003/0216932 | A1 | 11/2003 | Foley |
| 2003/0220868 | A1 | 11/2003 | May |
| 2009/0089223 | A1 | 4/2009 | Dawson |

OTHER PUBLICATIONS

Domowitz, Ian, 1995, "Electronic Derivatives Exchanges: Implicit Mergers, Network Externalities, and Standardization", The Quarterly Review of Economics and Finance, vol. 35, No. 2, Summer, 1995, pp. 163-175.

Senior, Adriana, Jun. 11, 1999, "Morgan Buying Into Network for On-Line Security Trades", American Banker, New York, NY, Jun. 11, 1999, vol. 164, Iss. 111; p. 1, obtained at the internet address: <http://www.proquest.umi.com/pqdlink?index=26&sid=1&srchmode=3&vinst=PROD&fmt=3& st...>, Mar. 25, 2004, 3 pages.

SwapsWire, Press Releases, Apr. 10, 2000, "Leading derivative dealers announce SwapsWire—a pioneering interest rate derivatives electronic dealing network", obtained at the internet address: <http://www.swapswire.com/press/10_04_00.asp>, Mar. 18, 2004, 2 pages.

Guardian Unlimited, The Guardian, Apr. 11, 2000, "Banks plan trading network for $52 trillion derivatives", obtained at the internet address: <http://www.guardian.co.uk/business/story/0,3604,178019,00.html>, Mar. 18, 2004, 2 pages.

Financial News Online, May 29, 2000, "Creditex Widens Access", obtained at the internet address: <http://www.efinancialnews.com/index.cfm?...>, Mar. 29, 2004, 1 page.

Ostrovsky, Arkade, Jun. 28, 2000, "Working towards a seamless link: Global Protocol by Arkady Ostrovsky: A project aimed at automating the flow of information across the entire derivatives network will deal initially interest rate swaps, with other products being incorporated into the standard over time [Surveys edition]", Financial Times, London, Jun. 28, 2000, p. 4, obtained at the internet address: <http://proquest.umi.com/pqdlink?index=1&sid=1&srchmode=1&vinst=PROD&fmt=3&sta...>, Mar. 25, 2004, 3 pages.

Looksmart, Business Wire, Nov. 7, 2000, "on Exchange Selects Exodus to Host Online Derivatives Exchange; Leading Online Derivatives Exchange Optimizes Network Performance by Selecting Leader in Complex Internet Hosting", obtained at the internet address: <http://www.findarticles.com/cf_0/m0EIN/2000_Nov_7/66657629/p1/article.jhtml>, Mar. 25, 2004, 3 pages.

Wall Street & Technology Online, Sep. 11, 2003, "Electronic Trading Newsflashes", obtained at the internet address: <http://www.wstonline.com/printableArticle/;jsessionid=1LJHDTNYRJNVMQSNDBCCKHY?doc _id=14...>, Dec. 5, 2003, 1 page.

Wall Street & Technology Online, Dec. 4, 2003, "Electronic-Trading Newsflashes", obtained at the internet address: <http://www.wstonline.com/printableArticle/;jsessionid=NA3QPNTTNKCOIQSNDBCCK...>, Dec. 5, 2003, 2 pages.

Sungard, "InTrader—The integrated, real-time solution for bank treasury and portfolio management", Sungard Securities Processing publication, 2003, 2 pages.

Network Magazine India, "Case Study: BSE implements intelligent switching architecture—Combining networks intelligently", obtained at the internet address: <http://www.expresscomputeronline.com/cgi-bin/ecprint/MasterPFP.cgi?doc=>, Dec. 5, 2003, 3 pages.

Network Magazine India, "BSE the Stock Exchange, Mumbai—Network Diagram", obtained at the internet address: <http://www.networkmagazineindia.com/200302/20030206bse.jpg>, Dec. 5, 2003, 1 page.

Orc Software, "ExNet Network", obtained at the internet address: <http://www.orcsoftware.com/Products/ExNetPIPNetwork.htm>, Dec. 5, 2003, 1 page.

Orc Software, "Orc Futures", obtained at the internet address: <http://www.orcsoftware.com/Products/OrcFutures.htm>, Dec. 5, 2003, 1 page.

Orc Software, "Orc Liquidator", obtained at the internet address: <http://www.orcsoftware.com/Products/OrcLiquidator.htm>, Dec. 5, 2003, 1 page.

Orc Software, "Orc Technology", obtained at the internet address: <http://www.orcsoftware.com/Technology/index.htm>, Dec. 5, 2003, 2 pages.

Orc Software, "Chicago Board of Trade certifies Orc Software for its electronic trading platform", obtained at the internet address: <http://www.orcsoftware.com/Company/PNR/PNR_031106_e-cbot_eng.htm>, Dec. 5, 2003, 2 pages.

Silicon Valley Biz Ink, "NYFIX, Inc. Routes OTC Orders to American Stock Exchange", obtained at the internet address: <http://www.prnewswire.com/cgi-bin/stories.pl?ACCT=SVBIZINK3.story&STORY=/www/story/11-24-2...>, Dec. 5, 2003, 2 pages.

Sungard, "Panorama EQN", obtained at the internet address: <http://www.sungard.com/products_and_services/stars/panorama/solutions/panoramaotcdistribution.htm>, Dec. 5, 2003, 2 pages.

Sungard, "Trading and Decision Support", obtained at the internet address: <http://www.sungard.com/products_and_services/stars/panorama/solutions/panoramatrading.htm>, Dec. 5, 2003, 5 pages.

Sungard, "Single Integrated Architecture", obtained at the internet address: <http://www.sungard.com/products_and_services/stars/panorama/solutions/panoramatechnologyandinfrastr...>, Dec. 5, 2003, 3 pages.

Trading Technologies International, Inc., "X_Trader TT Net", obtained at the internet address: <http://www.tradingtechnologies.com/blue_net.html>, Dec. 5, 2003, 1 page.

Trading Technologies International, Inc., "X_Trader Platform", obtained at the internet address: <http://www.tradingtechnologies.com/blue_xtrader.html>, Mar. 18, 2004, 3 pages.

Taulli, Tom. Investing in IPOs: Version 2.0. Bloomberg Press. Princeton. NH. 2001. pp. 40-41.

Dalton, John M. How The Stock Market Works. New York Institute of Finance. Paramus. NJ. 1993. pp. 121-126 and 148.

Curley, Michael T. & Walker, Joseph A. Barron's How to Prepare for the Stockbroker Examination Series 7. 2nd Edition, Barron's Educational Series. Hauppauge, NY. 2000. p. 181.

Kraynak, Joe. The Complete Idiot's Guide to PCs. 8th Edition. Alpha Books. Sep. 1, 2001. pp. 186-187.

Jennings, Nicholas R. & Woolridge, Michael J. Agent Technology. Springer. Heidelberg, NY. Apr. 1, 2000. pp. 25-26 and 267-268.

The Options Institute. Options: Essential Trading Concepts & Trading Strategies. McGraw-Hill. 1999. pp. 117-118.

O'Hara, Maureen. Market Microstructure Theory. Blackwell Publishing Ltd. Malden MA. 1997. pp. 7-9.

Angel, James J, Gastineau, Gary L!& Weber, Clifford J. Equity Flex Options: The Financial Engineers Most Versatile Tool. Frank J. Fabozzi Associates. New Hope, PA. 1999. pp. 67-68.

Williams, Michael S. & Hoffman, Amy. Fundamentals of the Options Market. McGraw-Hill Companies. New York, NY. 2001. pp. 4-5,56-58 and 87-89.

Turner, Martyn. The practical side of currency option dealing. Euromoney Treasury Manager. London, England. Nov. 5, 1993. p. 15.

Sales, Robert. Futures vet sees homogenized order-entry and execution in crystal ball. Wall Street & Technology. New York, NY. vol. 18, iss. 7. Jul. 2000. p. 126.

Turban, Efraim, McLean, Ephraim & Wetherbe, James. Information Technology for Management: Improving Quality and Productivity. John Wiley & Sons. 1996. pp. 237 and 310.

Chance, Don M. An Introduction to Derivatives: 4th Edition. The Dryden Press, Harcourt Brace & Company. Orlando, Florida. 1998. pp. 5,243 and 498.

Crawford, William B. Globex trading network ready for takeoff futures markets here could be recast. Chicago Tribune. Chicago, Illinois. Jun. 21, 1992. p. 1.

Cooper, Alan. About Fare: The Essentials of User Interface Design. IDG Books Worldwide. Foster City. CA. 1995. p. 203.

Murray, Rob. Money-Go-Round: 'Best price' share trading from Barclays. The Daily Telegraph. London, UK. Nov. 21, 1998. p. 9.

International Search Report PCT/US04/36206.

"Letting in Some Light: New Dealer Market Offers Juniors a Hand Up," The Northern Miner, Toronto, Ontario, vol. 89, issue 25, p. 4, Aug. 11-17, 2003.

CME: Deal4Free to launch a client to client electronic trading system; Client2Client trading to become reality, M2 Presswire, Coventry: Oct. 10, 2000, p. 1.

Cochran, "The Striking Price: Needed: Big Changes," Barron's, vol. 74, issue 19, p. MW12, May 9, 1994.

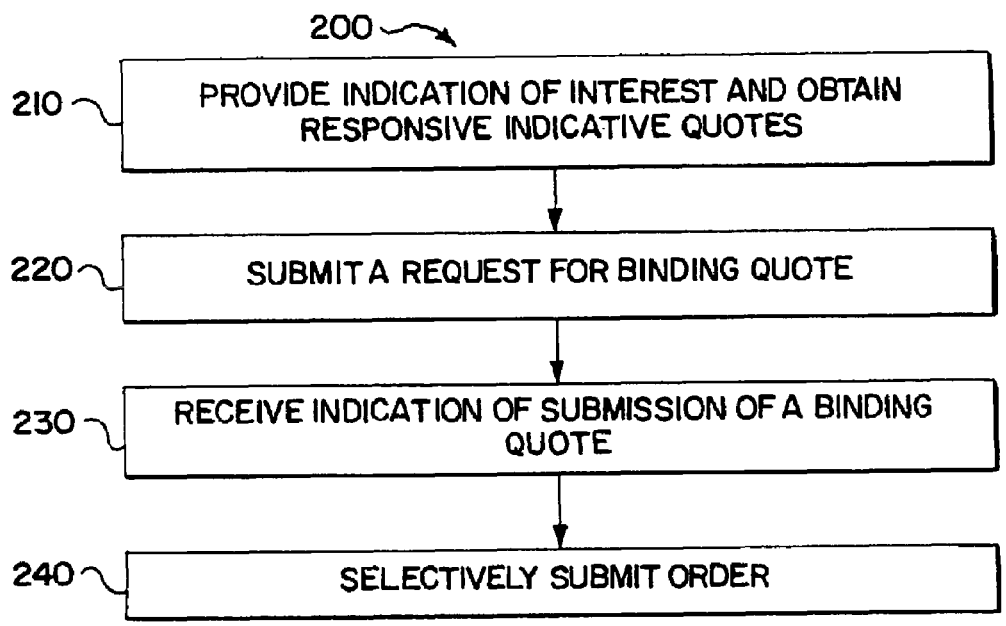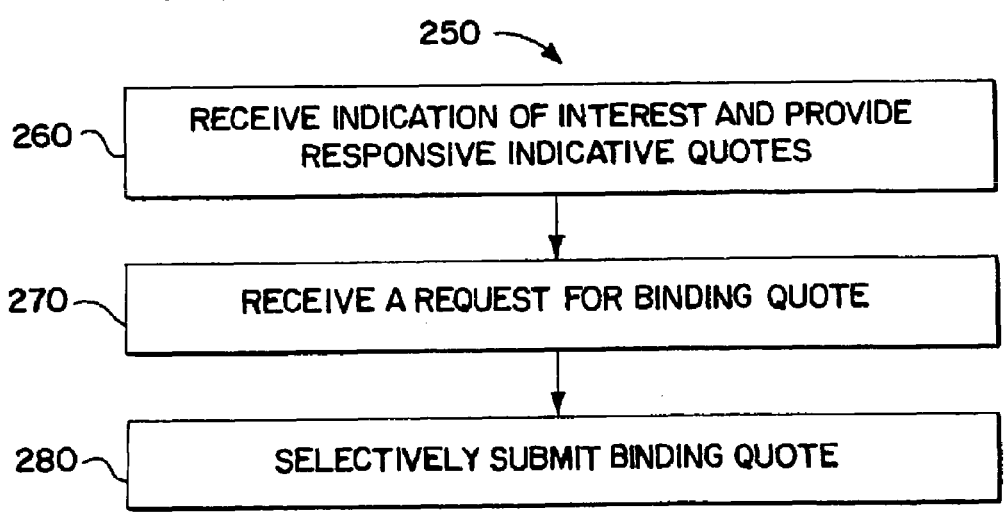

FIG. 3A

| CONTRACT | BID | BEST IND. BID | BEST IND. ASK | ASK | LAST |
|---|---|---|---|---|---|
| 30YR TREASURY DEC03 FUTURE | 226@107.03 | | | 342@107.04 | 114@107.04 |
| 30YR TREASURY DEC03 106 CALL | | 250@2.46 | 250@2.50 | | |
| 30YR TREASURY DEC03 106 STRADDLE | | 450@0.54 | 450@0.58 | | |
| 30YR TREASURY DEC03 107 CALL | | 375@1.41 | 375@1.44 | | |
| 30YR TREASURY DEC03 107 STRADDLE | | 400@1.12 | 275@1.14 | | |
| 30YR TREASURY DEC03 108 CALL | | 500@2.08 | 500@2.11 | | |
| 30YR TREASURY DEC03 108-110 CALL SPREAD | | 200@3.53 | 200@3.55 | | |
| 30YR TREASURY DEC03 109 CALL | | 200@3.62 | 200@4.01 | | |
| 30YR TREASURY DEC03 111 STRADDLE | | 200@4.17 | 200@4.19 | | |
| 30YR TREASURY DEC03 110 CALL | | 200@4.50 | 200@4.52 | | |

FIG. 3B

CONTRACT SELECTION

SHOW ALL CONTRACTS

CONTRACT
- 30YR TREASURY-ZB
- 30YR TREASURY OPTION-OZB
- 10YR TREASURY-ZN
- 10YR TREASURY OPTION-OZN

MONTH: 30-YEAR

CONTRACT TYPE

OPTION TYPE

CONTRACT LIST
- 30YR TREASURY-JAN04 99 CALL
- 30YR TREASURY-JAN04 100 CALL
- 30YR TREASURY-JAN04 101 CALL
- 30YR TREASURY-JAN04 102 CALL
- 30YR TREASURY-JAN04 103 CALL
- 30YR TREASURY-JAN04 104 CALL
- 30YR TREASURY-JAN04 105 CALL
- 30YR TREASURY-JAN04 106 CALL
- 30YR TREASURY-JAN04 107 CALL
- 30YR TREASURY-JAN04 108 CALL
- 30YR TREASURY-JAN04 109 CALL
- 30YR TREASURY-JAN04 110 CALL
- 30YR TREASURY-JAN04 111 CALL
- 30YR TREASURY-JAN04 112 CALL
- 30YR TREASURY-JAN04 113 CALL
- 30YR TREASURY-JAN04 114 CALL
- 30YR TREASURY-JAN04 115 CALL
- 30YR TREASURY-JAN04 116 CALL
- 30YR TREASURY-JAN04 117 CALL
- 30YR TREASURY-JAN04 118 CALL
- 30YR TREASURY-JAN04 119 CALL
- 30YR TREASURY-JAN04 120 CALL
- 30YR TREASURY-JAN04 121 CALL
- 30YR TREASURY-JAN04 122 CALL
- 30YR TREASURY-JAN04 123 CALL

[ADD] [REMOVE]

TAB LIST
- 30YR TREASURY-DEC03 FUTURE
- 30YR TREASURY-DEC03 107 CALL
- 30YR TREASURY-DEC03 108 CALL
- 30YR TREASURY-DEC03 109 CALL
- 30YR TREASURY-DEC03 110 CALL
- 30YR TREASURY-DEC03 111 CALL
- 30YR TREASURY-DEC03 109 STRADDLE
- 30YR TREASURY-DEC03 110 STRADDLE
- 30YR TREASURY-DEC03 111 STRADDLE
- 30YR TREASURY-DEC03 112 STRADDLE

[UP] [DOWN] [CLEAR TAB LIST]

[SAVE] [CANCEL]

| FUTURE | CALCULATE BID | CALCULATE ASK | A/C/E BID | A/C/E ASK |
|---|---|---|---|---|
| ZNZI | 105.210 | 105.210 | 106.315 | 107.000 |

| FUTURE | SPREAD TICKS | CALCULATE BID | CALCULATE ASK | A/C/E BID | A/C/E ASK |
|---|---|---|---|---|---|
| ZNUI | 0.0 | 105.210 | 105.210 | 104.295 | 104.300 |

REFRESH BID AND ASK

FIG. 5A

L LDe-RFQ-TESTMM02-SIMULATION     _ □ ×

FILE TOOLS VIEW HELP

| CUSTOMER ACCTS | PREFERENCES | ORDER OVERVIEW | CONTRACT SELECTION |

| 30 YEAR | 30 YR SPREADS | 10 YEAR | 10 YR SPREADS | 5 YEAR | 5 YR SPREADS | FUTURE LEVELS | STRANGLES | STRADDLES | CUSTOMER |

| | CONTRACT | BID | OWN IND. BID | BEST IND. BID | BEST IND. ASK | OWN IND. ASK | ASK | LAST |
|---|---|---|---|---|---|---|---|---|
| | 30YR TREASURY DEC03 FUTURE | 226@107.03 | | | | | 342@107.04 | 114@107.04 |
| e-RFQ | 30YR TREASURY DEC03 107 CALL | | 300@2.51 | | 250@2.50 | 300@2.51 | | |
| e-RFQ | 30YR TREASURY DEC03 108 CALL | 350@2.08 | 350@2.08 | 500@2.08 | 500@2.11 | 350@2.11 | 350@2.11 | |
| e-RFQ | 30YR TREASURY DEC03 109 CALL | | 375@1.41 | 375@1.41 | 375@1.44 | 375@1.44 | | |
| e-RFQ | 30YR TREASURY DEC03 110 CALL | | 400@1.12 | 400@1.12 | 275@1.14 | 400@1.16 | | |
| e-RFQ | 30YR TREASURY DEC03 111 CALL | | 450@0.54 | 450@0.54 | 450@0.58 | 450@0.58 | | |
| e-RFQ | 30YR TREASURY DEC03 109 STRADDLE | | 200@3.51 | 200@3.53 | 200@3.55 | 200@3.55 | | |
| e-RFQ | 30YR TREASURY DEC03 110 STRADDLE | | 200@3.60 | 200@3.62 | 200@4.01 | 200@4.02 | | |
| e-RFQ | 30YR TREASURY DEC03 111 STRADDLE | | 200@4.17 | 200@4.17 | 200@4.19 | 200@4.19 | | |
| e-RFQ | 30YR TREASURY DEC03 112 STRADDLE | | 200@4.49 | 200@4.50 | 200@4.52 | 200@4.52 | | |

CROSS REQUEST     e-RFQ HISTORY

| | CONTRACT | BID | OWN IND. BID | BEST IND. BID | BEST IND. ASK | OWN IND. ASK | ASK | LAST |
|---|---|---|---|---|---|---|---|---|
| e-RFQ | 30YR TREASURY DEC03 108 CALL | 350@2.08 | 350@2.08 | 500@2.08 | 500@2.11 | 350@2.11 | 350@2.11 | |

READY     TRADE HISTORY     NUM

FIG. 5B

| CONTRACT | BID | OWN IND. BID | BEST IND. BID | BEST IND. ASK | OWN IND. ASK | ASK | LAST |
|---|---|---|---|---|---|---|---|
| 30YR TREASURY DEC03 I08 CALL | 350@2.08 | | 500@2.08 | 500@2.11 | | 350@2.11 | |

QUOTE-30YR TREASURY-DEC03 I08 CALL -11/03/2003 03:56:11 PM

ACCOUNT: 97046
ORDER TYPE: LIMIT
ACT: MI

☑ BID  WIDEN  TIGHTEN  ☑ ASK
PRICE: 2.08        PRICE: 2.11
QTY: 350          QTY: 350
UP
DOWN
SEND    CLOSE

QTY. INCREMENT
● 50
○ 100
○ 250

| CONTRACT | BID | OWN IND. BID | BEST IND. BID | BEST IND. ASK | OWN IND. ASK | ASK | LAST |
|---|---|---|---|---|---|---|---|
| 30YR TREASURY DEC03 III STRADDLE | | 200@4.17 | 200@4.17 | 200@4.19 | 200@4.19 | | |

QUOTE-30YR TREASURY - DEC03 III STRADDLE -11/03/2003 03:56:11 PM

ACCOUNT: 97046
ORDER TYPE: LIMIT
ACT: MI

☑ BID  WIDEN  TIGHTEN  ☑ ASK
PRICE: 4.17        PRICE: 4.19
QTY: 200          QTY: 200
UP
DOWN
SEND    CLOSE

QTY. INCREMENT
● 50
○ 100
○ 250

FIG. 6A

L De-RFQ - TESTTRD02 - SIMULATION   _ □ X

FILE  TOOLS  VIEW  HELP

| CUSTOMER ACCTS | PREFERENCES | ORDER OVERVIEW | CONTRACT SELECTION |

| LIST1 | LIST2 | LIST3 | LIST4 | LIST5 | LIST6 | LIST7 | LIST8 | LIST9 | LIST10 |

| | CONTRACT | BID | BEST IND. BID | BEST IND. ASK | ASK | LAST |
|---|---|---|---|---|---|---|
| | 30YR TREASURY DEC03 FUTURE | 226 @ 107.03 | | | 342 @ 107.04 | 114 @ 107.04 |
| e-RFQ | 30YR TREASURY DEC03 106 CALL | | 250 @ 2.46 | 250 @ 2.50 | | |
| e-RFQ | 30YR TREASURY DEC03 106 STRADDLE | | 450 @ 0.54 | 450 @ 0.58 | | |
| e-RFQ | 30YR TREASURY DEC03 107 CALL | | 375 @ 1.39 | 375 @ 1.44 | | |
| e-RFQ | 30YR TREASURY DEC03 107 STRADDLE | | 400 @ 1.12 | 275 @ 1.15 | | |
| e-RFQ | 30YR TREASURY DEC03 108 CALL | | 500 @ 2.08 | 500 @ 2.11 | | |
| e-RFQ | 30YR TREASURY DEC03 108-110 CALL SPREAD | | 200 @ 3.51 | 200 @ 3.55 | | |
| e-RFQ | 30YR TREASURY DEC03 109 CALL | | 200 @ 3.60 | 200 @ 4.01 | | |
| e-RFQ | 30YR TREASURY DEC03 109 STRADDLE | | 200 @ 4.17 | 200 @ 4.21 | | |
| e-RFQ | 30YR TREASURY DEC03 110 CALL | | 200 @ 4.48 | 200 @ 4.52 | | |

ORDER: BUY-30YR TREASURY-DEC03 108 CALL-7 EXECUTED, 0 WORKING, 0 CANCELLED - TIME: 11/03/2003 04:27:23PM

CROSS REQUEST | | | | | | e-RFQ HISTORY |

| | CONTRACT | BID | BEST IND. BID | BEST IND. ASK | ASK | LAST |
|---|---|---|---|---|---|---|
| e-RFQ | 30YR TREASURY DEC03 108 CALL | 250 @ 2.09 | 500 @ 2.08 | 500 @ 2.11 | 243 @ 2.11 | 7 @ 2.11 |

602

TRADE HISTORY

600

READY     NUM

SET SKEW-USERNAME-XYZ

10YR TREASURY-DEC03

| SKEW | SPREAD PARAMETERS | | | | SAVE SKEW | CANCEL |

LOAD FROM...    CLEAR ALL    SAVE SPREAD PARAMETERS    CANCEL

| | NARROW | WIDE | OFFSET | SIZE | | | NARROW | WIDE | OFFSET | SIZE | |
|---|---|---|---|---|---|---|---|---|---|---|---|
| STRADDLE | 1 | 3 | 0.25 | 250 | CLEAR | SPREAD TYPE 16 | 0 | 0 | 0 | 0 | CLEAR |
| STRANGLE | 1 | 3 | 0.25 | 250 | CLEAR | SPREAD TYPE 17 | 0 | 0 | 0 | 0 | CLEAR |
| CALL VERTICAL | 1 | 3 | 0.25 | 250 | CLEAR | SPREAD TYPE 18 | 0 | 0 | 0 | 0 | CLEAR |
| PUT VERTICAL | 1 | 3 | 0.25 | 250 | CLEAR | SPREAD TYPE 19 | 0 | 0 | 0 | 0 | CLEAR |
| CALL CALENDAR | 1 | 3 | 0.25 | 250 | CLEAR | SPREAD TYPE 20 | 0 | 0 | 0 | 0 | CLEAR |
| PUT CALENDAR | 1 | 3 | 0.25 | 250 | CLEAR | SPREAD TYPE 21 | 0 | 0 | 0 | 0 | CLEAR |
| SPREAD TYPE 7 | 1 | 3 | 0.25 | 250 | CLEAR | SPREAD TYPE 22 | 0 | 0 | 0 | 0 | CLEAR |
| SPREAD TYPE 8 | 1 | 3 | 0.25 | 250 | CLEAR | SPREAD TYPE 23 | 0 | 0 | 0 | 0 | CLEAR |
| SPREAD TYPE 9 | 1 | 3 | 0.25 | 250 | CLEAR | SPREAD TYPE 24 | 0 | 0 | 0 | 0 | CLEAR |
| SPREAD TYPE 10 | 1 | 3 | 0.25 | 250 | CLEAR | SPREAD TYPE 25 | 0 | 0 | 0 | 0 | CLEAR |
| SPREAD TYPE 11 | 1 | 3 | 0.25 | 250 | CLEAR | SPREAD TYPE 26 | 0 | 0 | 0 | 0 | CLEAR |
| SPREAD TYPE 12 | 1 | 3 | 0.25 | 250 | CLEAR | SPREAD TYPE 27 | 0 | 0 | 0 | 0 | CLEAR |
| SPREAD TYPE 13 | 1 | 3 | 0.25 | 250 | CLEAR | SPREAD TYPE 28 | 0 | 0 | 0 | 0 | CLEAR |
| SPREAD TYPE 14 | 1 | 3 | 0.25 | 250 | CLEAR | SPREAD TYPE 29 | 0 | 0 | 0 | 0 | CLEAR |
| SPREAD TYPE 15 | 1 | 3 | 0.25 | 250 | CLEAR | SPREAD TYPE 30 | 0 | 0 | 0 | 0 | CLEAR |

METHOD AND SYSTEM FOR PROVIDING OPTION SPREAD INDICATIVE QUOTES

REFERENCE TO RELATED APPLICATIONS

This application is a divisional under 37 C.F.R. §1.53(b) of U.S. patent application Ser. No. 12/505,946 filed Jul. 20, 2009 now U.S. Pat. No. 8,306,902, which is a is a divisional under 37 C.F.R. §1.53(b) of U.S. patent application Ser. No. 10/726,851 filed Dec. 2, 2003 now U.S. Pat. No. 7,584,140, which is a continuation-in-part of U.S. patent application Ser. No. 10/685,907, filed Oct. 15, 2003, entitled "NETWORK AND METHOD FOR TRADING DERIVATIVES BY PROVIDING ENHANCED RFQ VISIBILITY," now U.S. Pat. No. 7,197,483, which claims the benefit of the filing date under 35 U.S.C. 119(e) of U.S. Provisional Patent Application Ser. No. 60/418,982, filed Oct. 15, 2002, entitled "NETWORK AND METHOD FOR TRADING DERIVATIVES BY PROVIDING ENHANCED RFQ VISIBILITY," the entire disclosures of which are hereby incorporated by reference.

FIELD OF THE INVENTION

The invention is in the field of electronically trading derivatives.

BACKGROUND OF THE INVENTION

Electronic trading is revolutionizing the futures industry. European futures trading has been fully computer-based for several years. In the U.S., many of the benchmark financial futures contracts (U.S. Treasury futures, S&P 500 and Nasdaq 100 futures) are now primarily transacted on the screen. The rapid growth of electronic trading is further illustrated by the fact that the German-Swiss Exchange (EUREX) founded in 1990 has surpassed the CBOT as the leader in futures trading.

There are, however, substantial limitations of current electronic trading systems when applied to institutional options and futures spread trading. Designed more than a decade ago, electronic futures trading platforms are based on rigid, outdated architecture. All message traffic passes through centralized Exchange servers. Communication is 'one-to-all' and 'all-to-one', i.e. every price update triggers thousands of messages. Users are unable to flexibly query the market for indicative quotes for 'wholesale' orders or customized spread combinations. While the existing trading platform architecture works for futures trading with a single price point, it fails completely in markets that are 'relational', i.e. every price is linked to other—or hundreds of other—prices. This problem is illustrated by the relationship of E-futures, E-options and E-spreads.

Outright E-futures have a single price point. As the futures price changes, traders cancel, modify and replace single orders. This is illustrated in Table I.

TABLE I

30-Year Bond Futures Book
Contract - December 2000

| BIDS | | ASKS | |
|---|---|---|---|
| Quantity | Price | Price | Quantity |
| 350 | 98.21 | 98.22 | 220 |
| 250 | 98.20 | 98.23 | 150 |
| 300 | 98.19 | 98.25 | 400 |

Options involve puts and calls and combinations of puts and calls and/or futures, as well as straddles, strangles, butterflies, strips, etc. all of which result in thousands of price points being linked to each future. Thus, as the underlying futures price moves, thousands of price updates are needed. This is illustrated in Table II.

TABLE II

30-Year Bond Options Book
Contract - December 2000

| | | BIDS | | ASKS | |
|---|---|---|---|---|---|
| Instrument | Strike | Quantity | Price | Price | Quantity |
| Call | 9800 | 200 | 130 | 136 | 100 |
| Call | 9900 | 150 | 55 | 63 | 50 |
| Put | 9800 | 50 | 47 | 52 | 250 |
| Put | 9700 | 175 | 28 | 31 | 300 |
| Straddle | 9600-1000 | 200 | 55 | 58 | 150 |
| Call Spread | 9800-1000 | 250 | 25 | 26 | 50 |

There are few 'real' prices displayed for options and spreads on electronic screens because market makers cannot make tight markets across numerous price points. As the futures price moves, 'stale' options and spread prices remain exposed to the market.

Current electronic options and spread markets have significant disadvantages. In the United States, despite the rapid growth of electronic futures, there is no real volume in electronic options, options spreads and complex futures spreads. These markets still trade on the floor. In Europe, where futures markets are 100% electronic, price discovery in options, options spreads and complex futures spreads takes place manually in an informal "upstairs" or "cash" phone-brokered market. The European 'phone-brokered market' is widely disliked by all participants except the brokers who charge commissions to both sides of a trade. European options screens do not show 'real' prices. End users complain of the lack of transparency (only the brokers know the real bids and offers) and the inability of end users to verify that orders have received 'best execution' treatment. Users and market makers also do not like the high cost of this brokerage and brokerage costs for market makers are passed on to users in the form of wider bid—ask spreads. Exchanges, regulators and end users are concerned by the counterparty risk inherent to the system: market integrity rests on the performance guarantees of unregulated, thinly capitalized brokers.

The regulatory concerns surrounding the practices of the European, phone-brokered options and spread markets are so severe that this issue has become a focal point in the CFTC's and U.S. Congress' review of the application by Eurex to start a U.S. futures exchange in the Spring of 2004. Major market participants have provided testimony to Congress describing the lack of market integrity in the phone-brokered, "payment-for-order" flow model that exists today on European exchanges. There is substantial concern that the phone-brokered options and spread trades violate ERISA obligations requiring competitive execution of pension fund and other institutional customer derivatives orders.

U.S. Pat. No. 6,016,483 describes a computer-based system for determining a set of opening prices for options traded on an options exchange and for allocating public order imbalances at the opening of trade. This patent is incorporated by reference in its entirety.

BRIEF DESCRIPTION OF THE FIGURES

FIGS. 2A and 2B are flow diagrams of the interaction on the network of the market makers and a subscriber;

FIG. 3A is a schematic of a computer screen seen by a subscriber;

FIG. 3B illustrates the subscriber's contract selection screen;

FIG. 3C illustrates a subscriber order ticket screen;

FIG. 3D illustrates an order entry screen for an outright option contract;

FIG. 3E illustrates an order entry screen for an options spread contract;

FIGS. 4A, 4B and 4C illustrate the market maker control or indicative price publishing screens;

FIG. 5A illustrates an individual market maker's indicative quotes and the best LD indicative quote;

FIGS. 5B and 5C illustrate embodiments of the market maker's binding quote ticket;

FIGS. 6A and 6B illustrate action rows for displaying data associated with e-RFQs, and order entry based on action rows;

FIGS. 8A, 8B, and 8C depict alternative market maker control or indicative price publishing screens.

SUMMARY OF THE INVENTION

Figure 1A:
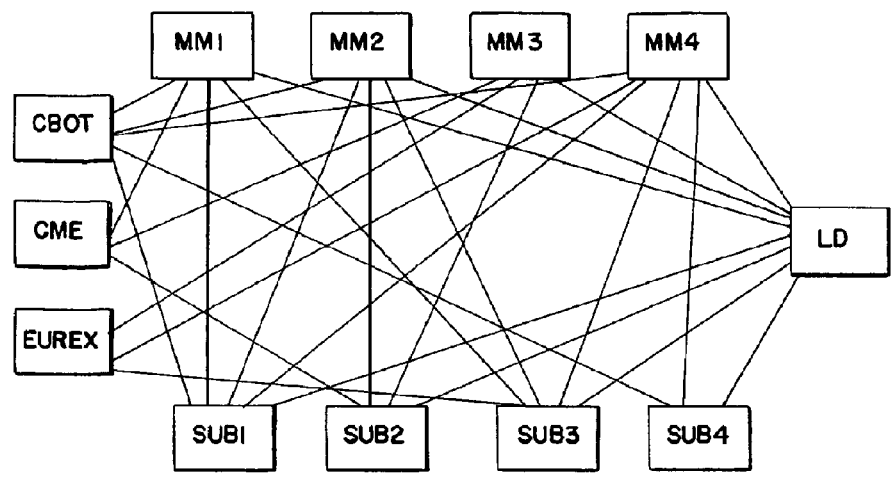
FIGS. 1A and 1B are schematics of alternative embodiments of the overall network (LD network)

A computer network and method for electronically trading derivatives is provided. The system includes networks and methods where a control or network managing station in the network acts as a facilitator for the market makers and subscribers to make a trade at an Exchange.

One method of trading includes providing indicative quotes to market participants (which typically includes subscribers, but may also include market makers) to provide a non-binding indication of how the market makers are likely to price the particular derivative combination. Market makers provide the indicative quotes or indicative quote information to the indicative quoting system on the managing station, which then forwards the quotes to market participants. For combination products comprising multiple legs, the system is preferably configured to generate indicative quotes and provide them to market participants. The generated combination indicative quotes are based on the indicative quote information provided by the market makers for the legs, or individual securities, within the combination. Preferably, the market makers provide indicative quote information including a theoretical value for each leg, and the trading system is then able to generate quotes based on the theoretical values. Alternatively, when theoretical values have not been provided for one or more legs of the combination, the quoting system may use indicative quotes to infer the theoretical prices, or may use indicative quotes from a related series to infer the theoretical price for the leg.

In addition, market makers may provide customized indicative quoting parameters to specify certain quote generation characteristics for the trading system to use when generating quotes for combination trades. The additional indicative quoting parameters may include a spread parameter and a quote offset parameter.

Once the indicative quotes have been appropriately disseminated, a market participant may then submit an e-RFQ, which is an electronic request for a binding quote for the derivative. The e-RFQ preferably causes the current order book to be displayed on all subscribers terminals, typically in the form of a row indicating the derivative of interest along with the current binding bid and binding ask prices. The indicative bid and ask prices may also be displayed, as well as the quantity (if any) requested in the e-RFQ. Market participants may then elect to submit a binding quote or order for the corresponding derivative.

Typically, the market participants will await an indication that a market maker has submitted a binding quote or order. The order ticket is preferably generated automatically by the subscriber selecting either the firm bid or firm ask cells associated with the derivative of interest. Additionally, current book data (pending orders and quotes) are preferably provided and updated on the order ticket to provide the relevant information to the subscriber in an easily accessible format. Providing market participants with an indication that another market participant has requested a binding quote alerts the market participants of activity in the market, thereby allowing them to participate more readily.

The e-RFQ may also cause certain data to be displayed on market makers' terminals. The presentation of the data on the market maker's screen may differ depending on whether the market maker is actively providing indicative quotes in that particular derivative. Preferably, the receipt of an e-RFQ at a market maker terminal automatically provides a screen whereby market makers may submit binding quotes. The method may include automatic generation of a binding quote ticket upon receipt of the e-RFQ. For market makers who are not actively quoting the derivative corresponding to the e-RFQ, the method may additionally include the display of an action row containing the booked orders and quotes associated with the e-RFQ, and the generation of a binding quote ticket in response to a market maker's selection of the action row.

In an alternative embodiment, the e-RFQ may result in order book information being displayed at the subscriber station, the market maker terminals, or both. Specifically, the order book information includes not just the top of the book (the best bid and ask) but also includes orders and quotes that are near the best prices. In this manner, the market participants can view the order book depth to obtain a better overall view of the activity in the particular derivative. The desired depth may be pre-selected, or adaptively changed by the user.

In another alternative embodiment, the system may be configured to display all trades occurring in the market, or trades in those derivatives that have been selected by a subscriber.

DETAILED DESCRIPTION OF THE INVENTION

In one embodiment, the network managing station consummates the trade between a market maker and a subscriber by matching binding quotes and orders and then clearing the trade at an Exchange. The computer network for electronically trading derivatives comprises: (a) network managing station; (b) one or more market maker stations; (c) one or more subscriber stations; (d) one or more Exchanges.

The network managing station connects market makers and subscribers for making real time indicative quotes, issuing requests for quotes, obtaining binding quotes and wherein the market maker and subscriber are in communication with an Exchange for sending binding quotes and orders to the Exchange for clearing and confirming transactions.

The method and network provides for continuous quotes on the user's desktop that are backed up by significant liquidity. Numerous markets can be quoted simultaneously and users can make custom inquiries. The best price is guaranteed because the executed order matches the best price in the Exchange. The method and apparatus described herein enables liquid and efficient electronic trading of exchange listed products, thereby reducing risks associated with alternative over-the-counter mechanisms. That is, the system provides both the flexibility inherent in over-the-counter (OTC) trading and the reduced risk of Exchange matching and/or clearing. The system is unexpectedly advantageous in that it integrates, in real-time, market makers' indicative and binding quotes.

FIG. 1A illustrates the network and interactions of market maker, subscriber, network manager and Exchanges. MM1, MM2, MM3, and MM4 are market maker servers that provide indicative and binding quotes. Sub 1, Sub 2, Sub 3 and Sub 4 are subscriber stations through which subscribers query indicative quotes, request binding quotes, and send orders to Exchanges such as the CBOT, CME and Eurex. LD is a network managing station that provides a directory of participants receiving or providing quotes.

The network manager in one embodiment facilitates trading between subscribers and market makers who submit binding quotes and orders to an Exchange for clearance. In another embodiment, the network manager (LD) or control station may match the binding quotes and orders and send them to an Exchange for clearance. Through this network, market makers, subscribers, Exchanges and the network managing station can electronically communicate with each other. Subscribers can directly and flexibly query market makers' databases. The network minimizes traffic that passes through centralized servers and therefore has a high capacity. Messaging traffic of price updating is thereby reduced by limiting quote traffic to interested parties who query specific contracts and/or contract combinations.

Figure 7:
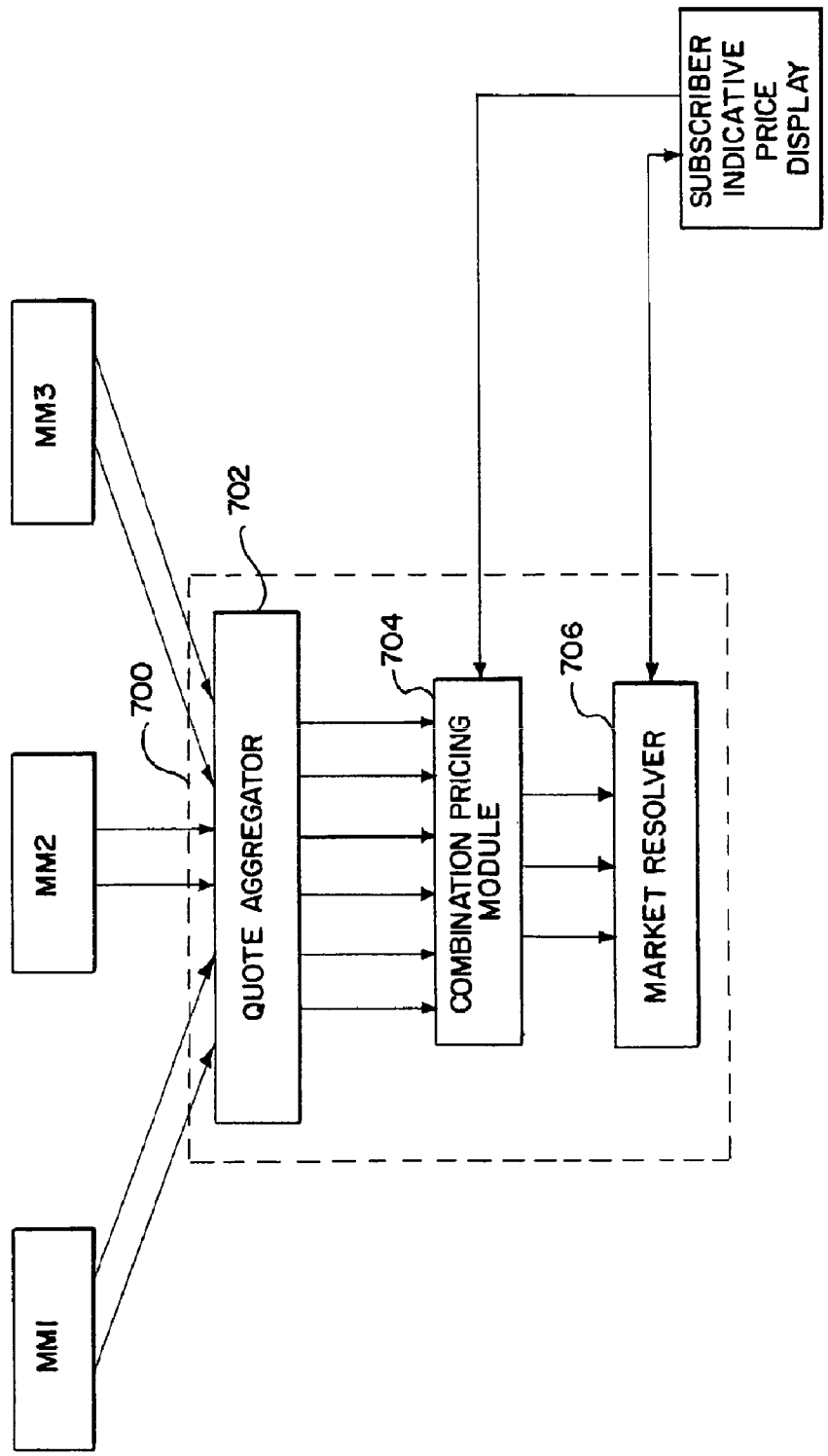
FIG. 7 depicts a preferred network management system for generating option spread indicative quotes.

In an alternative embodiment shown in FIG. 7, the network manager includes a quote engine 700, including a quote aggregator 702, a combination pricing module 704, and a market resolver module 706. The quote aggregator 702 collects and stores indicative quotes that are published from the various market makers (e.g., MM1, MM2, MM3). For combination trades, the combination pricing module 704 generates indicative quotes based on the market makers' published indicative quotes and on indicative quoting spread parameters provided by the market makers. The market resolver 706 then determines the best bid/best ask and an aggregate quantity for indicative quotes.

A subscriber station (Sub 1, Sub 2, Sub 3 and Sub 4 of FIG. 1) has hardware and software to query indicative quotes, request binding quotes, and send orders to Exchanges. In one embodiment, the subscriber station consists of a Windows-based PC running an application that allows users to login, select symbols, and receive quotes for those symbols. Other embodiments include hand held computing devices that run the applications. Alternatively, the hand-held device acts as a wireless data terminal that communicates with the PC running the applications. As one of ordinary skill can appreciate, further alternatives hardware and software arrangements include hand-held devices and PC workstations, wherein the software functionality is appropriately divided between the two devices.

In another embodiment, the subscriber station is a gateway application connecting a subscriber's internal network to the network also referred to as the (LD) network. In this case, the functions of the subscriber station are controlled by other applications running throughout the subscriber's internal network. These applications may be trading front-ends or trading programs that the subscriber wishes to use to access the LD network. In this case, the LD subscriber gateway provides a protocol for passing messages between the networks. These messages include querying indicative quotes, quote updates, requesting binding quotes, and routing orders.

FIG. 3A illustrates an example of the Market Overview screen that displays indicative quotes for symbols and combinations of symbols as well as binding quotes in the Exchange order book. The CBT Bid/CBT Ask columns display the current best bid/ask price and quantity in the a/c/e electronic order book. The LD Bid/Ask columns display the best indicative bid/ask, size, and volatility from the market makers on the LD network. The screen of FIG. 3A displays real time price updates for symbols selected by the user via selection screen of FIG. 3B.

FIG. 3B is an example of the screen that allows the user to select symbols and combinations of symbols for which quotes will be requested. The selected symbols and the corresponding requests for indicative quotes provide an "indication of interest" or IOI to the market makers. Symbol Selection is performed as follows: highlight a symbol in the left column and use the button to move it to the view list, thereby making it an active symbol. Double-clicking a symbol also makes it active. Preferably, typing a value in the 'symbol List Filter' box limits the content of the list—for example, typing 'OZB V1' displays the available thirty-year October options.

Selecting a spread is performed by highlighting a spread in the right column and then using the button to make it active. Double-clicking a spread also makes it active. The three drop-down boxes in the center filter the list of spreads by product, month, and Call or Put. The spreads can also be filtered by selecting the spread type from the drop-down over the right column. Other types of combination products are preferably named using a suitable naming convention, and are then selected in a similar manner.

Removing an item from the view list is done by double-clicking an item in the view list or highlighting the item and using the 'remove' button. Ordering the display is done with the 'sort' button, which causes the items in the view list to be sorted by symbol, expiration date, and strike. Individual symbols can be selected and moved up and down using 'up' and 'down'.

Figure 1B:
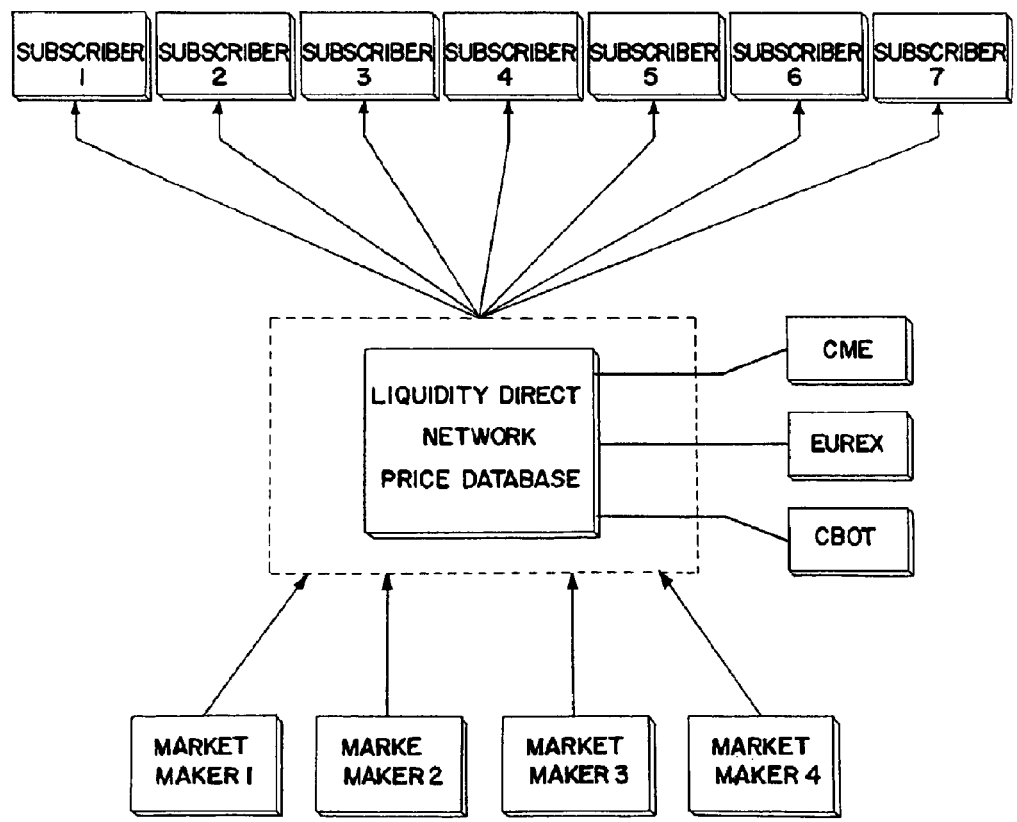

Depending upon the hardware, software, and network conditions, the subscriber station may actively query the network management station, and the quote engine 700 provides indicative quotes, as in the network architecture shown in FIG. 1B. In a preferred embodiment, the market makers provide indicative quote data sets in the form of indicative quotes, to the network management system which stores them in a centralized database. The indicative quotes are preferably a double-sided price (buy/sell) and a quantity. The quote data sets may comprise or include a fair value (theoretical value). In alternative embodiments, the quote data sets may comprise tables from which double-sided quotes may be obtained based on the price of the underlying security. Subscribers then indicate the products for which they are interested in receiving quotes. The network management system then provides specific indicative quotes to the users who have indicated an interest in receiving them. In alternative embodiments using a peer-to-peer configuration (FIG. 1A), the subscriber stations may directly query the market makers for updated quotes (every second, for instance, or when the underlying price moves). In other circumstances, the subscriber station receives quote updates in real-time (i.e. 'pushed' by the market makers).

Figures 3C, 3D, 3E:
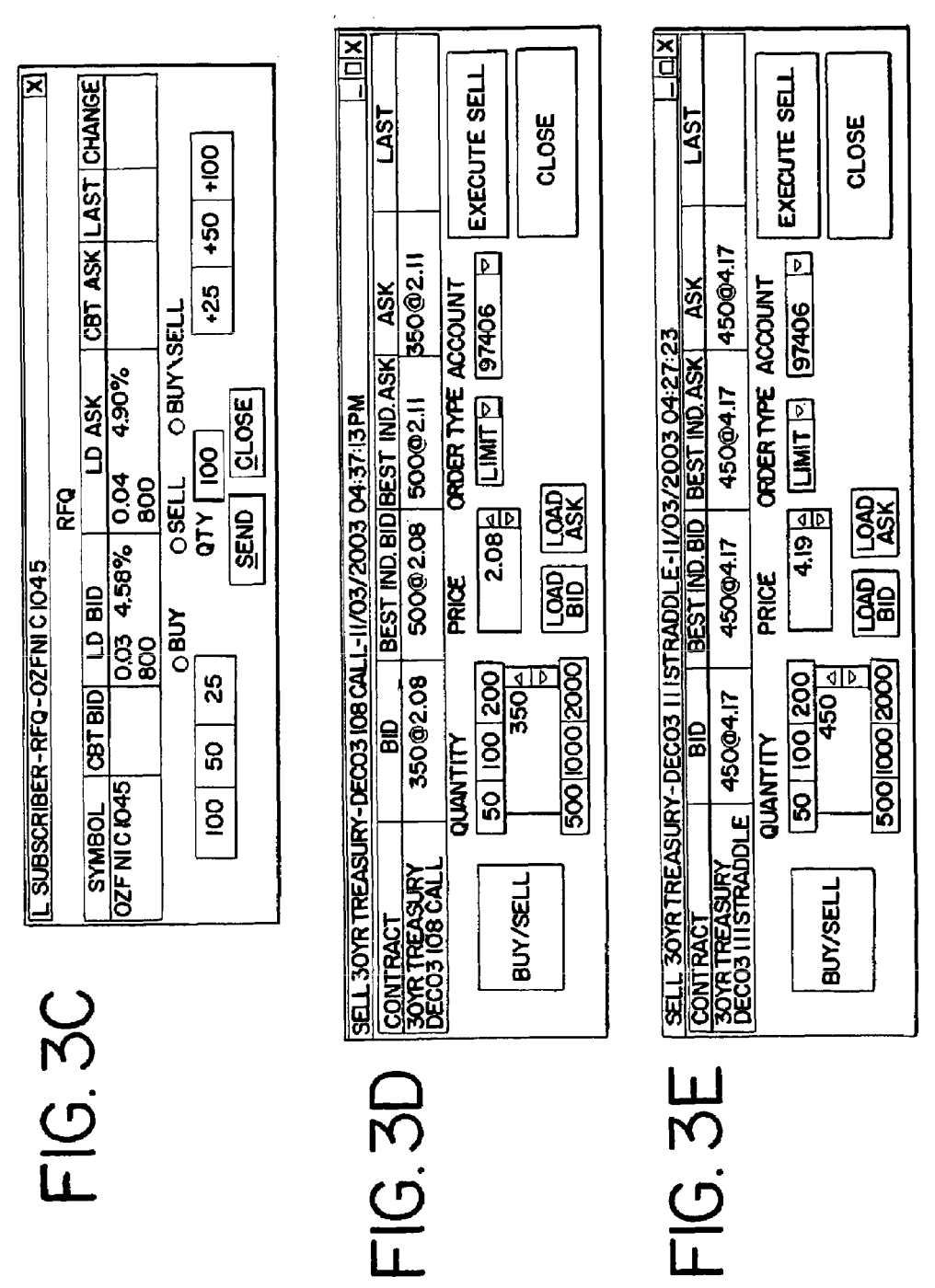

In one embodiment, when a user wishes to enter an order against one of the indicative quotes, double clicking the symbol pulls up an order entry window as shown in FIG. 3D (or FIG. 3E in the case of a straddle). Pressing the "sell now" button simultaneously informs the appropriate market maker of the request for a binding quote and submits the corresponding order to the exchange.

In yet another embodiment, the invention provides for unilateral communication in accordance with CFTC rules between subscribers and market makers for the submission of binding quotes and orders as a result of the unilateral communication. For example, a subscriber may receive an indicative quote from a market maker and respond by sending a request for quote (RFQ) to an Exchange, alerting all market participants of the RFQ. Thus, the market maker receives an e-RFQ from a subscriber at the same time the RFQ is received by other market participants. The market maker may immediately enter a binding quote at the Exchange and the subscriber may immediately enter an order at the Exchange.

In a further embodiment, the e-RFQ results in certain quote data to be displayed on a market participant's screen, preferably on their respective workstations, e.g., sub1-sub4. The display of the data related to the e-RFQ is preferably in a section of the screen reserved for indicating the presence of e-RFQs so that market participants can easily identify the presence of e-RFQs that have been submitted by other market participants. The area of the display is referred to as action rows, because the e-RFQ-related data are preferably displayed in row format, as depicted in action row 600 in FIG. 6A. As seen in FIG. 6A, the action row 600 includes the symbol of the derivative for which an e-RFQ was received, the firm bid (binding bid), the indicative bid, the indicative ask, and the firm ask (binding ask). The binding-bid and -ask representing the best bid and ask prices are often referred to as the "top of the book." Note that the e-RFQ preferably also includes the quantity of the requested quote contained in the e-RFQ. Typically, there may not be any binding (i.e., firm) quotes for a given derivative, and hence none would be displayed in the action row. As soon as a firm, or binding, quote is entered into the system (from a market maker or any other market participant), the action row data is updated to reflect the firm bid and/or ask. In addition, the system may be configured to display order book depth, such that orders and/or quotes near the best bid and ask prices are also displayed.

In an alternative embodiment, the subscriber or market maker may configure a filter to display action rows only for contracts of interest. For example, the subscriber may identify products by product grouping, such as all options on a given underlying contract or product. One example would be 30 year treasury options, or the 10 and 5 year treasury options, or any combination thereof, or Swap options (typically swapping a contract tied to a LIBOR rate to another contract tied to another LIBOR rate). Other examples include Dow Jones Industrial Average options, S&P 500 options, Eurodollar options, Eurodollar strips, or Eurodollar futures trading, or all options on single stock futures.

In a further embodiment, the process of entering an order and trading with the LD network is a two-step process. The user first enters an e-RFQ that is sent to the LD market makers as well as to the exchange (e.g., a/c/e, which is the CBOT electronic trading platform). After market makers enter their quotes into the exchange, the user enters an order to match against the best bid (or ask) in the book.

Thus when a user wishes to enter an order against one of the indicative quotes, the user preferably double-clicks the symbol (or by clicking on the bid or the ask price) in the display of FIG. 3A to activate an electronic Request For Quote (e-RFQ) window as shown in FIG. 3C. The quantity may be left blank, or a value may be specified. Clicking the send button sends the RFQ simultaneously to the Exchanges, which effectively may result in sending the RFQ to 30,000 terminals, and also sends the e-RFQ to the LD network to the LD market makers, and in one embodiment, the e-RFQ is also sent to the market participants' workstations for display in an action row. The RFQ sent to the exchange preferably conforms to existing RFQ exchange formats and would typically include only the contract of interest. Preferably, exchange RFQ formats are modified to accommodate additional e-RFQ data fields, including the quantity requested. The e-RFQ sent to the LD market makers and market participants preferably includes the contract of interest, the indicated price and the indicated quantity. Alternatively, the LD e-RFQ may also include additional parameters such as what side the requested quote is for (buy/sell). Upon sending the e-RFQ, the e-RFQ window of FIG. 3C is replaced with the Order Entry Screen of FIG. 3D (or FIG. 3E in the case of a straddle).

The order ticket shown in FIG. 3D allows the subscriber to change the quantity, price, and buy/sell. The subscriber can also select the appropriate account from a drop down list. After confirming the details, the order may be submitted. Preferably, the subscriber awaits an indication from the market maker that a binding quote has been submitted prior to submitting the order. This indication appears in the "CBT Bid" and/or "CBT Ask" fields of the Order Entry screen shown in FIG. 3D (or FIG. 3E). Such indication that a binding quote has been submitted is an advantageous feature of the system described herein. In one embodiment, the binding quote, which may include a binding bid price, a binding ask price, or both, is received from the exchange using the same communication method employed by the exchange to provide binding quote and order information to all exchange users. That is, the system submits the binding quote to the exchange, and the exchange acknowledges the quotes and publishes it to all exchange users. In an alternative embodiment, the system is configured to forward binding quote information to subscribers at the same time it initially submits the binding quote to the exchange.

Figure 6B:
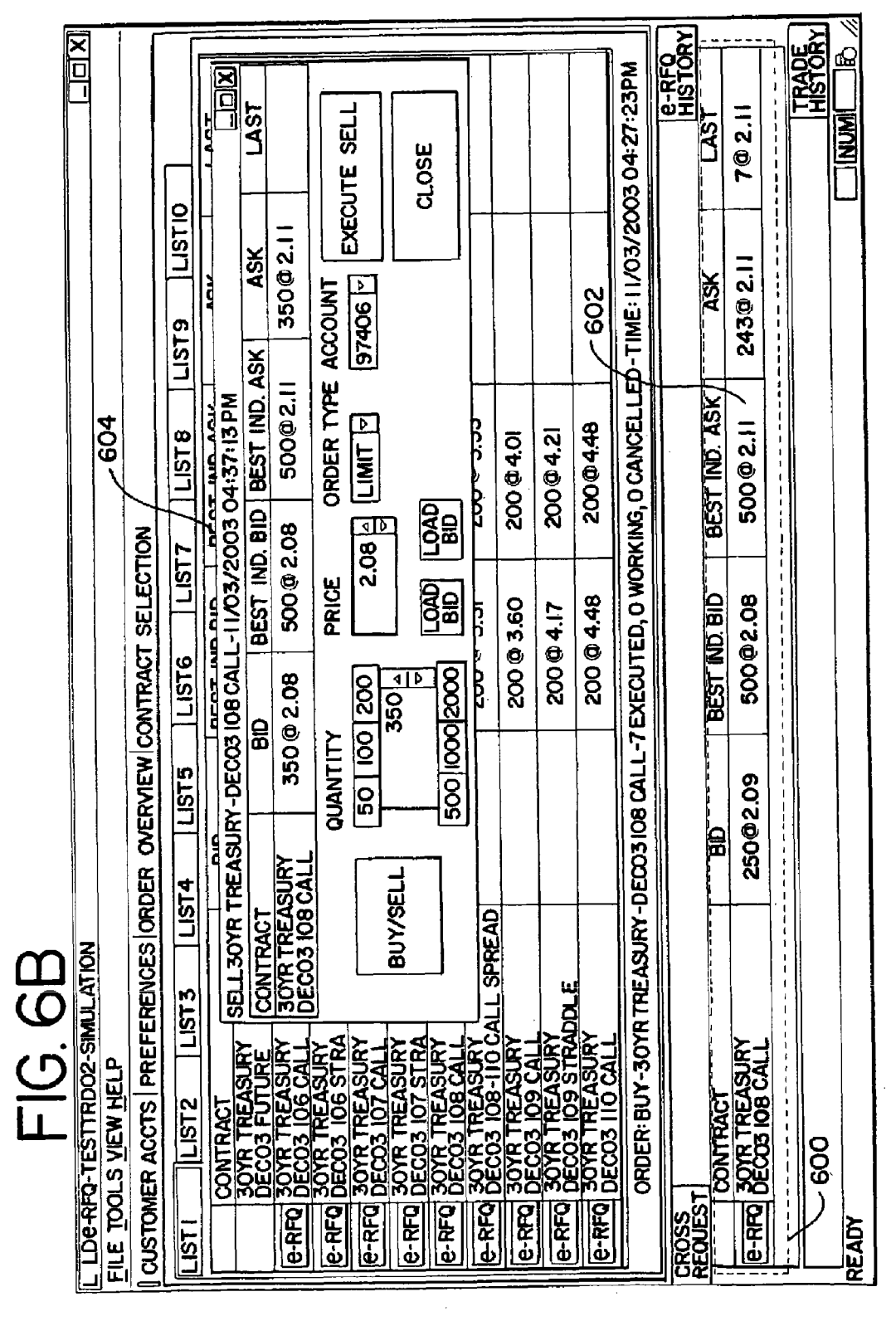

Because the e-RFQ is displayed in an action row, any market participant may elect to participate in trading against any binding quotes that are submitted in response to the e-RFQ. A market participant may select the action row for the e-RFQ of interest and prepare an order ticket in anticipation of a binding quote being entered into the system. Typically, if a subscriber wishes to enter a buy order in response to an e-RFQ displayed in an action row, the subscriber would select the "FIRM Ask" entry 602 in the action row of FIG. 6A. In response, the buy order entry ticket 604 is displayed as shown in FIG. 6B. Note that the order entry ticket 604 contains the default values according to the current binding quote. Alternatively, the market participant may select the "INDICATIVE Ask" box to display a buy order ticket containing default data according to the indicative ask quote. In this manner, the market participant may prepare an order ticket prior to the receipt of a binding quote. In either case, the market participant may modify the details of the order, and may participate in the trade just as if they had made the initial e-RFQ. In addition, the order ticket preferably duplicates the action row by providing the indicative and firm quotes, which is updated to reflect any changes, such as the submission of any firm quotes. In this manner, the activity in the market is identified to all participants by the display of e-RFQs, and the corresponding firm quotes in the book.

For market makers, the data that is displayed or the manner in which it is displayed in response to an e-RFQ may depend upon whether the market maker is currently providing indicative quotes for the corresponding derivative. Specifically, for market makers who are publishing indicative quotes or indicative quote data sets from which indicative quotes may be obtained or derived, the market maker station preferably displays the quote entry screen of FIG. 5B in response to the receipt of an LD e-RFQ sent by the subscriber. The display includes six columns: firm bid, the market maker's current indicative bid, the best indicative bid, the best indicative ask, the market maker's current indicative ask, and the firm ask. Color coding is preferably used to indicate whether the market maker's indicative quotes are the same or worse than the current best indicative quotes. FIG. 5C depicts an alternative quote entry screen.

The quote entry screen, upon display, has been "loaded" or preprocessed to incorporate data from the market maker's indicative quote, including the price and depth (volume of contracts). In a further preferred embodiment, the loaded ticket may incorporate updated quote data based on more recent market data (such as changes to the price of the underlying instrument, or volatility). The quote entry screen thereby facilitates the market maker's entry of a binding quote in accordance with the market maker's indicative quote or an updated quote. Upon the market maker's submission of the quote and its receipt by the exchange, the subscriber's order entry ticket of FIG. 3D (or FIG. 3E) will be updated to reflect the binding quote data. The subscriber can then decide whether to submit the order after having evaluated the specific values (i.e., bid/ask and volume) associated with the binding quote. Preferably, all LD orders are IOC (Immediate or Cancel) or FOK (Fill or Kill). This means orders will either execute or cancel, and orders will not post to the book.

In the event that the market maker is not currently publishing indicative quotes for the derivative corresponding to the received e-RFQ, the system may be configured to automatically display a ticket for the submission of a binding quote. Alternatively, the market maker station displays action rows similar to those displayed at the subscriber workstations as shown in FIG. 6A, and the binding quote ticket may be displayed in response to the market maker selecting the action row. Preferably the data fields in the market maker's binding quote ticket are automatically populated with the best indicative quote data. The market maker may then modify the binding quote data prior to submission to improve the prices, back off the prices, or adjust the quantity. In addition, the system may be configured to display order book depth for market makers, such that orders and/or quotes near the best bid and ask prices are also displayed.

FIGS. 2A and 2B illustrate the interaction of the parties through the network by way of flow diagrams 200 and 250. Market makers, for example at station MM2 and MM4 of FIG. 1, connect to the network managing station (LD) to indicate quotable markets; At step 210, Subscriber station, e.g. Sub 3, provides and indication of interest to the network managing station for specific trading products. The subscriber station may receive the indicative quotes from a centralized database (e.g., FIG. 11B), or in a peer-to-peer environment (e.g., FIG. 1A), may receive them directly from the market makers active in the requested security, for example, MM2 and MM4. If the network managing station LD pushes a new futures price, this may be used to trigger Subscriber Sub 3 to query for updated quotes either from the network management station or from market makers MM2 and MM4.

As discussed above, other triggering devices may be used to cause subscribers to request updated quotes. For example, quotes may be requested at periodic intervals. The period may be a predefined period set by the subscriber, or may be adjusted up (or down) automatically in response to various other factors. Typical factors may include high (low) volume, high (low) volatility, or even an indication from the subscriber that an e-RFQ and/or order may be imminent. This indication may be by way of a screen activated button or similar subscriber input.

In an alternative embodiment of FIG. 1B, the network management station LD receives and stores the published indicative quote values on behalf of the market makers. This is depicted in FIG. 7. Individual subscriber stations may then query (or subscribe to) the LD system to receive the published indicative quotes. The process of generating and modifying the published indicative quotes is described below. The use of a centralized quoting engine is preferred when providing quotes for combination trades that comprises two or more securities, or "legs". In particular, the LD system preferably generates quotes for the combination trades from the market maker's published quote data or quote data sets for the individual component legs of the combination.

At step 210 in the process, a subscriber such as Sub 3 issues an electronic request for quote (e-RFQ). The subscriber may then selectively submit an order in step 240, or preferably, may first await the completion of the optional step 230, which is the receipt of an indication that the market maker has submitted a binding quote.

With respect to FIG. 2B, the market maker's involvement is depicted in flow diagram 250. At step 260, either the market maker or the network management station receives an indication of interest from a subscriber and responds by providing one or more indicative quotes. Upon receipt of an e-RFQ, which is interpreted as a request for a binding quote in step 270, the market makers, for example MM3 and MM4, may respond by selectively sending a binding quote to an Exchange, or directly to the LD. The binding quote is then transmitted to the subscriber, either from the LD system or via the exchange. In this way the network provides for electronic communication between market maker, subscriber and Exchanges with the assistance of a network managing station LD so that a subscriber can obtain indicative quotes, initiate indications to trade, receive responses to indications to trade, issue binding quotes and forward binding quotes to an Exchange. The subscriber can send orders to an Exchange that can be electronically matched and cleared by an Exchange. In the alternative, the network managing station may match binding quotes and orders and clear the trades at an Exchange. Orders may be matched on a price-time priority basis.

Alternatively, an allocation mechanism may be used, whereby certain market makers may be allocated some or all of the resulting trade based on criteria other than time priority. That is, one or more market makers may qualify to be allocated a portion of the trade even if their quotes were not first in time, but otherwise matched the price at which the trade occurred. In this manner, certain market makers may be given trade allocation priority based on certain criteria, such as number or percentage of responses to e-RFQs, volume traded, payment of fees, a status designation (e.g., market specialist, or designated primary market maker), etc.

As discussed above, requests for binding quotes result in an updated bid/ask quote being sent to the Exchange. During this process, trading parameters under the control of the market maker are accessed to ensure that trading remains under the control of the market maker. In certain circumstances, the market maker may decline to submit a binding quote, or may change his quote from that displayed on the subscriber screen as indicative.

Specifically, a market maker station preferably has hardware and software to provide indicative quote data sets including indicative quotes for subscribers and provide binding quotes to be sent to Exchanges. The options' theoretical values from which the quotes are derived are calculated using industry standard algorithms, namely the Black-Scholes Model and for certain instruments the American Whaley Model. Components of the indicative quote preferably include the bid price, bid quantity, ask price, and ask quantity. Additionally, the market maker may calculate two sets of prices, one with a narrow spread (or range between the bid and ask), and one with a wider spread. This allows the market maker to switch between narrow and wide spreads during the trading day in response to market activity. Bid price and ask price are determined by decreasing (for bid) and increasing (for ask) the theoretical value by a variable amount that depends on various risk parameters, as follows:

N and W are parameters maintained by the market maker to determine the narrow and wide spread values; FV is the fair value of the option as calculated by the above-mentioned standard pricing models; V is Vega, a measure of the rate of change in an option's theoretical value for a one-unit change in the volatility of the underlying. Vega is an output of the standard pricing models.

Then, the bid and ask prices for the quote (B, A) are calculated as follows:

| | |
|---|---|
| B(narrow) = | FV − V * N |
| B(wide) = | FV − V * W |
| A(narrow) = | FV + V * N |
| A(wide) = | FV + V * W |

Quantity for the quote is calculated by taking four variables maintained by the market maker for each options month and using the Delta and Vega of the individual option symbol to calculate the quantity across the range of options strike prices, as follows:

$$Q = \max[Q_{min}, \min[Q_{max}, D_{max} \div D, V_{max} \div V]],$$

where $Q_{min}$ is the minimum quantity, maintained by the market maker; $Q_{max}$ is the maximum absolute quantity, maintained by the market maker; $D_{max}$ is the maximum quantity in terms of aggregate Delta, maintained by the market maker; $V_{max}$ is the maximum quantity in terms of aggregate Vega, maintained by the market maker; D is Delta, a measure of the rate of change in an option's theoretical value for a one-unit change in the price of the underlying security, and is an output of the standard pricing models; and, V is Vega, as defined above.

In one embodiment, the market maker station consists of a database containing pricing data from which quotes (both indicative and binding) are determined in response to a subscriber request. The parameters of this publishing application and database are controlled by screens similar to FIGS. 4A, 4B and 4C.

The market marker generates a matrix of bid and ask prices and quantities at different volatilities and underlying prices that cover the expected short-term movement of the market. The matrix preferably also includes theoretical values in addition to the bid and ask values. This matrix is accessed to provide indicative quotes, based on the current volatility (as controlled by the market maker) and the underlying price (usually provided by the appropriate Exchange in a data feed). Market makers 'tweak' their bids and asks by changing their volatility levels. They can also pull (revoke) their quotes, either individually or by product, as well as send in new arrays at any time.

Figure 4A:
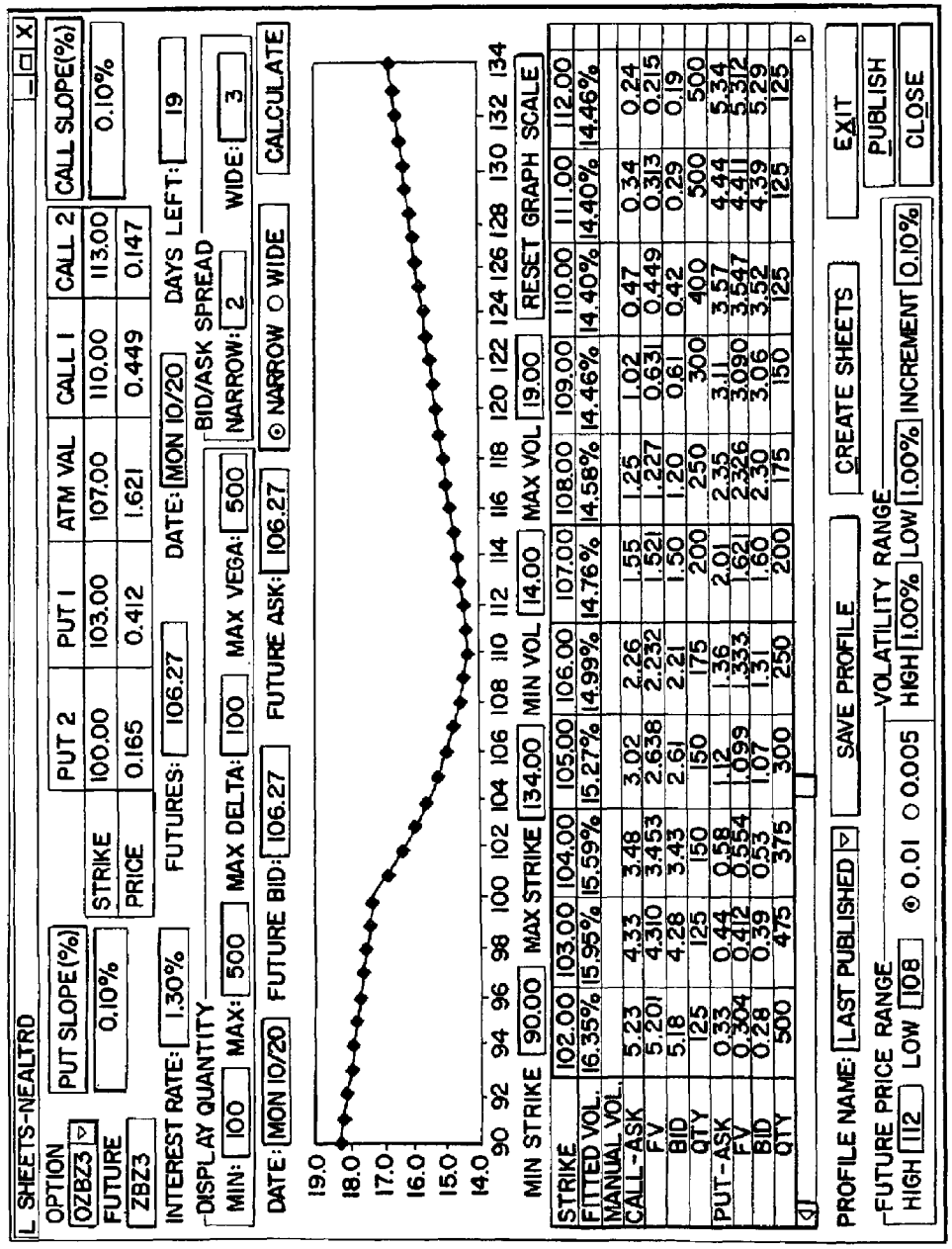

The "Sheets" screen of FIG. 4A allows the market maker to calculate implied volatilities, Bid, Fair and Ask values and the Quantity, given a few inputs. The market maker may select an option from the drop-down box in the upper left corner (Future and Days Left boxes fill in automatically once option is chosen). To plot a new curve, the market maker enters strikes and prices for the option chosen. The table at the top of the Sheets window is used to enter strikes in decimal format. Corresponding prices are entered using tick format. The put price is used for the ATM strike. Other fields for the option chosen are entered. The slope is defined as (change in implied volatility)/(change in strike); 0.15 is a typical starting value for Call Slope and Put Slope which determine the curve's shape in the wings.

The market maker enters the Interest Rate, Futures (price in tick format) and Date, which can be any date as long as the entries made for strikes, prices and call/put slopes correspond to this date. The entries for the Display Quantity and Bid/Ask Spread fields (to be associated with the second Date) are completed, as well as the Min and Max Contracts. This will be used to limit the quantities shown on the Sheets screen and the Tweak screen of FIG. 4B. (Example: 100 Min and 500 Max will keep quantities between 100 and 500 regardless of quantity multiplier).

The market maker enters (in decimal format as a fraction of a tick) the width of the preferred bid/ask spread. Vega preferably does not affect this calculation. (For example, entering 0.25 is a quarter tick above/below fair value for Bid/Ask). The market maker then enters (in ticks) the Max Ticks and Min Ticks allowed as the difference between the bid and the ask. The second Date, Future Bid and Future Ask (prices in tick format) are entered for which desired calculations are made in the large table below the graph. Then, the market maker selects Narrow or Wide to choose from the two sets of Bid/Ask Spread values that have been entered.

Finally, the market maker selects the "Calculate" button, resulting in new calculated values being entered in the large table. The Call Slope and Put Slope may be adjusted as necessary to obtain a suitable fit on wing prices in the table, followed by a recalculation to check table prices. Further, the parameters for the graph may be adjusted, including Min Strike, Max Strike, Min Vol and Max Vol. Selecting "Reset Graph Scale" applies the new choices to the graph. Entries made on the Sheets screen may be saved by selecting the "Save Profile" button (publishing is not required in order to save).

To publish the quotes, the market maker may select a future price range for which to publish by entering future prices (tick format) in the High and Low fields (preferably keeping this range at 4 points or less to keep publishing times down). The market maker then selects either full (0.01) or half tick (0.005) increments. For Volatility Range, the market maker enters a High, Low and volatility Increment at which to publish, and chooses an increment of at least 0.05 and Volatility Range of at most 1% for High and Low to avoid long publishing times. "High" represents the percentage that volatility will go up and "Low" represents the percentage that volatility will go down for this publishing period. The action is completed by clicking the "Publish" button. Data will be saved in a temporary table which can be made "Live" using the "Tweak" screen of FIG. 4B. If there is any existing temp data, a pop-up box will ask the user if this data should be overwritten. All data entry is saved as the profile "Last Published."

Figure 4B:
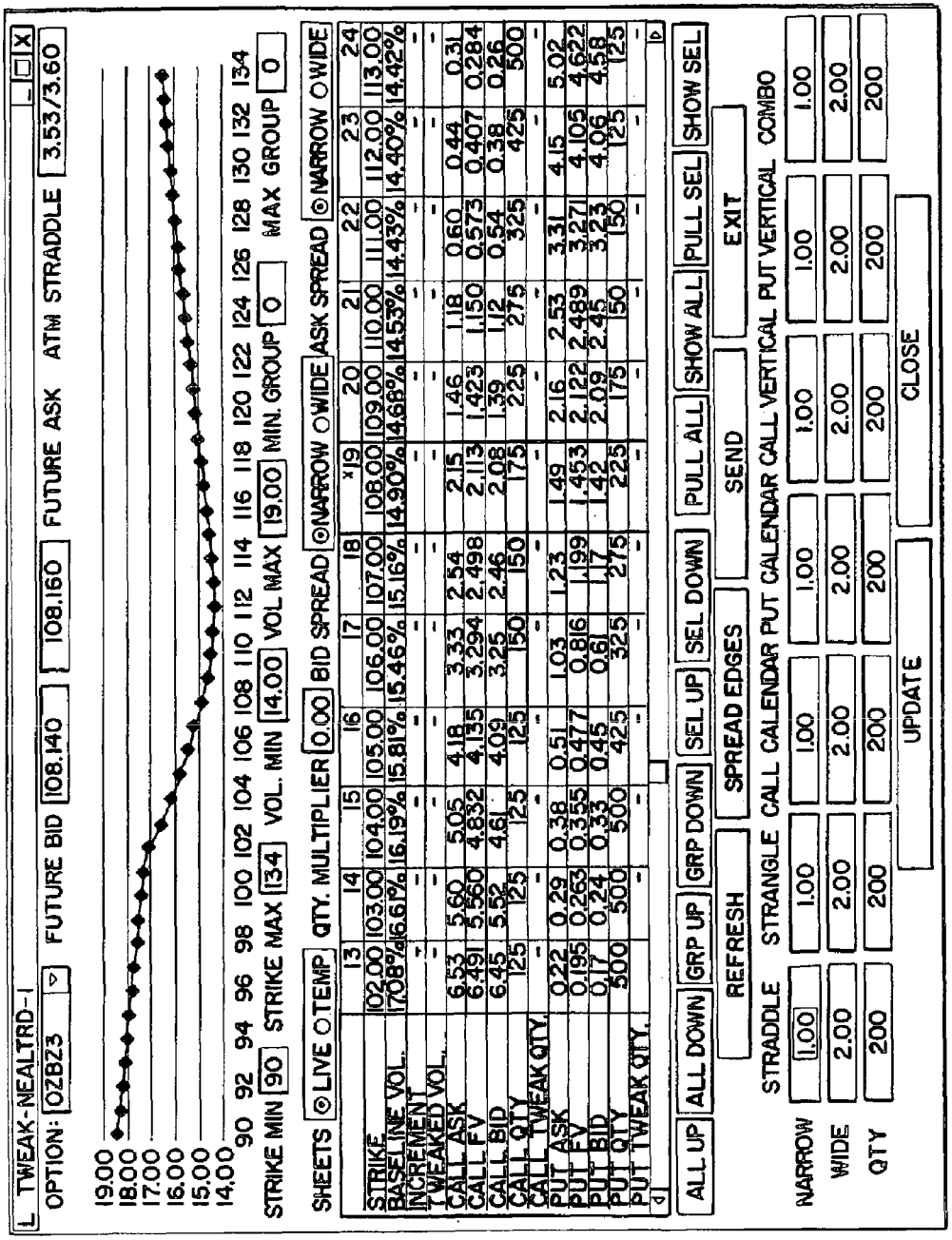

The Tweak screen is depicted in FIG. 4B, and is used to modify published "live" values (values that are being broadcasted to customers via Market Overview, or that have been sent to the centralized database of the quote engine 702) without republishing Once an option is published, Tweak contains temporary (Temp) data that may be modified by changing volatilities; once these changes are made, they can be applied to live data.

As described above, there are a number of methods for market makers to provide quoting information from which an indicative quote may be obtained and/or generated. That is, the market makers may provide: indicative quotes (double-sided prices and quantities); a theoretical value and a spread (wide or narrow or both); a double-sided indicative quote together with a theoretical value; tables from which double-sided quotes and/or theoretical values may be determined. All of these embodiments and equivalent forms of the data as known to those of skill in the art are referred to herein using the term "indicative quote data sets."

Figure 8A:
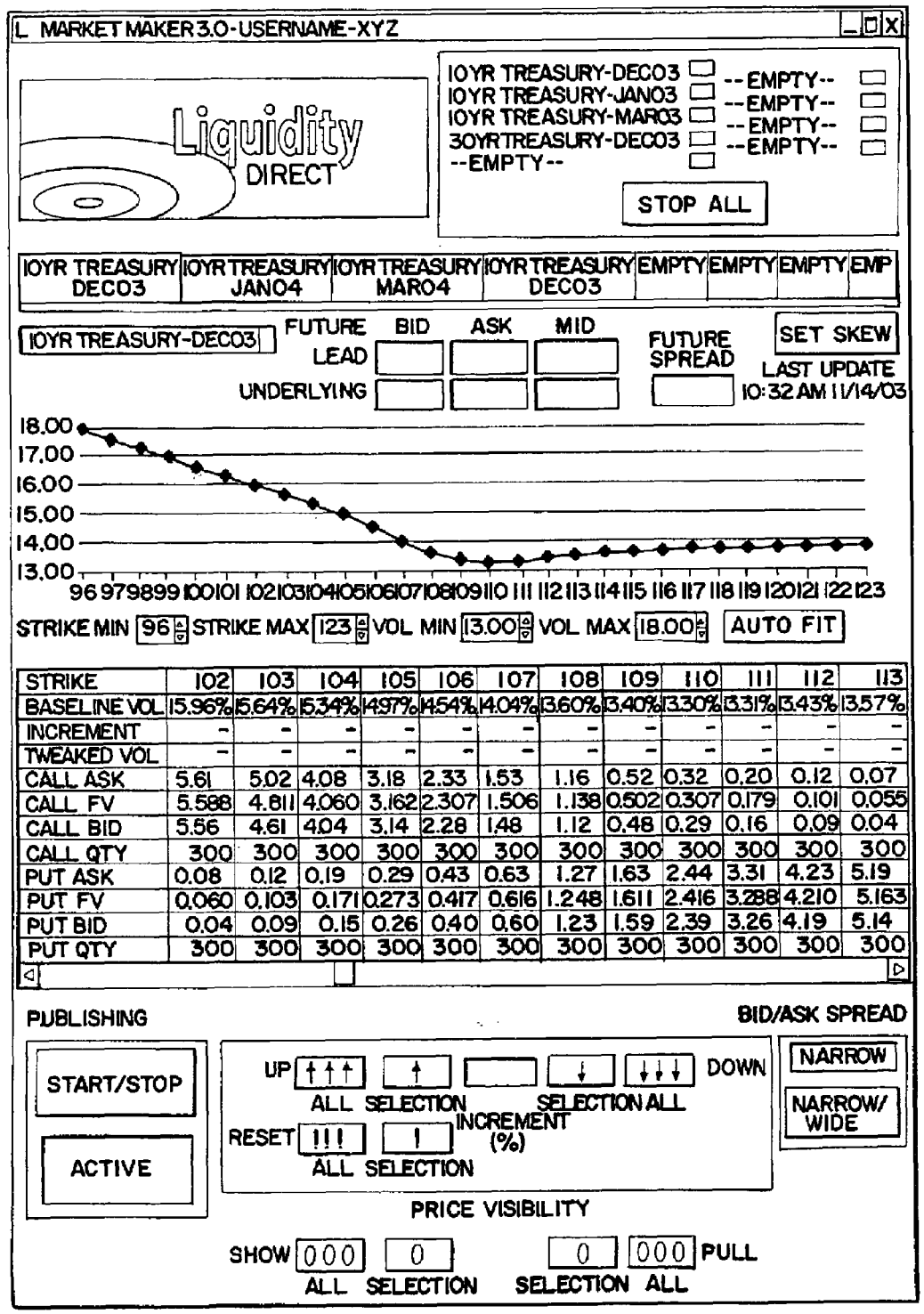
Figure 8B:
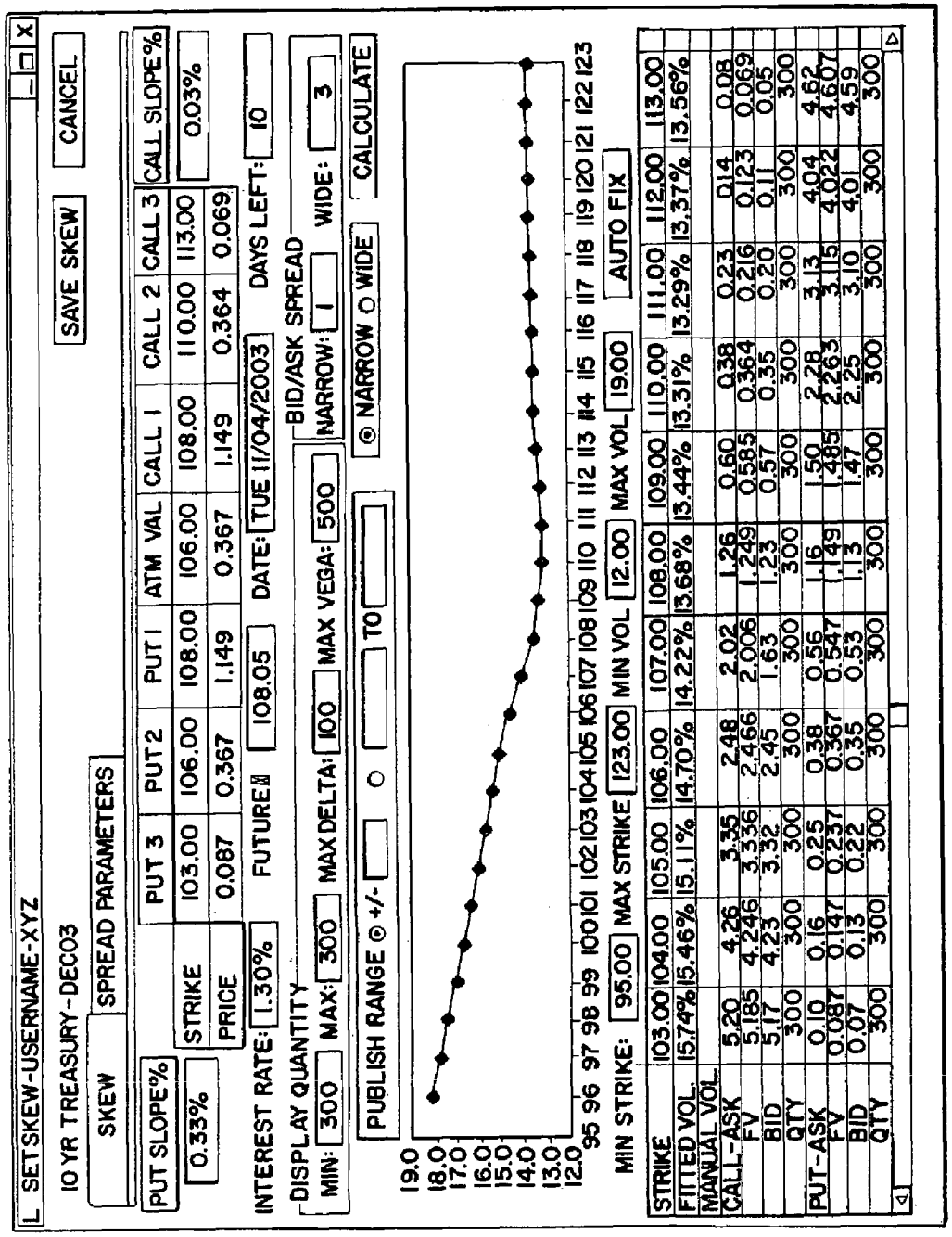

Alternative quote publishing interface screens are shown in FIGS. 8A, 8B, and 8C. FIG. 8A provides a method of "tweaking" the volatility by selecting desired columns (strike prices) and raising or lowering the volatility using the UP and DOWN buttons in the "Volatility Tweak" section of the screen, and a Narrow/Wide button for selecting the pricing spread of the outright option. Also provided is a START/STOP button to control whether quotes are actively being published (with the status "active" or "inactive" being displayed below the button), and a button to activate the input screen of FIG. 8B. FIG. 8B shows the underlying volatility curve information. FIG. 8C provides an input interface for specifying the spread parameters.

Depending on hardware, software, and network conditions, subscriber requests for indicative prices are treated either as a query which results in a single set of indicative quotes to be sent to the subscriber (every second, for instance, or when the underlying price moves), or as a request for continuous updates (i.e. 'pushed' by the network management system or the market maker). For a request for continuous updates, the network management system (or market maker station) monitors the underlying price and other factors that determine the indicative quote and 'pushes' a new indicative quote to the subscriber when necessary.

When a subscriber requests a price, the network management system (or market maker station) database process preferably uses the current futures price and market maker-specified volatility level to determine the current bid and ask for each market maker. The best price (highest bid and lowest offer) is then sent out to the subscriber. If two or more market makers are indicating the same price, the quantity is aggregated accordingly. The effect of this approach is to provide the subscriber with tighter and deeper markets due to the aggregation of competitive quotes from multiple market makers.

In an alternative embodiment, the published quote data or quote data sets includes an indicative bid, and indicative ask, a theoretical value, and a quantity (or quantities). That is, market makers may publish quotes (using the publishing application described above) to generate and publish a quote dataset. In an alternative embodiment, the quote data set consists of six values for each "outright" of a product (calls and puts) according to Bid/Ask or Mid-Market Future levels. The six values in the quote dataset are the indicative bid price, the indicative bid size, the indicative ask price, the indicative ask size, the delta, and the theoretical value of the option contract. The datasets are preferably updated for each outright option contract every time the price of the underlying future contract changes.

For combination trades, the network management system preferably generates indicative quotes based on the theoretical values provided by the market maker, rather than obtaining combination indicative quotes directly from the market makers. In the embodiments using centralized quote generation performed on behalf of market makers, the market makers have the ability to set and fine tune the bid and ask prices for their options spreads by maintaining quoting spread parameters, as shown in FIG. 8C. Spread parameters are associated with each options spread type being published by a market maker supported by the system. Option spread types currently defined and supported by the system are: straddles, strangles, vertical call spreads, vertical put spreads, calendar call spreads, calendar put spreads, 1×2 ratio spreads, custom ratio spreads, butterflies, and covered trades.

The quoting spread parameters are preferably a price spread (spread edge), price offset, and size. The spread edge is used to determine the width of the spread—that is, the difference between the bid and the ask (or one half the difference, depending on how the calculation is performed). The addition and/or subtraction of the spread edge may be referred to as applying a spread function. The offset is the amount that both the bid and ask are shifted up or down, to provide a pricing bias in the quote (a bias to increase either buys or sells of the particular security). This may be referred to as applying an offset function. In addition, some embodiments may utilize more than one fair value. Because the underlying security is typically quoted using a double sided price (bid/ask), either of those prices may be used to determine the fair value of the option contract. The notation used to represent this technique is, for example: "Call Fair Value$_{Future\ Bid}$" meaning that the fair value of the call option is based on the underlying future's bid price, and "Put Fair Value$_{Future\ Ask}$" meaning that the fair value of the put option is based on the underlying future's ask price.

The combination pricing module 704 preferably only calculates indicative markets for options spreads that are actively being disseminated to end users (subscribers). When an indicative market for a specific option combination, or spread, is requested, the combination pricing module 704 gathers the fair values for the composite legs of the combination and submits them, along with the market maker's spread parameters for that spread type, to a customized pricing algorithm that calculates the market maker's final indicative quote. In the event that the market maker has not provided a quote for one or more of the legs of the combination, but has provided quotes in a related series (e.g., a series having the same underlying security, but at a different strike, or expiration), then the combination pricing module 704 may derive a fair value to use in the pricing algorithm.

Indicative quotes for a requested combination are gathered from all publishing market makers and submitted to a market resolver 706 that determines the best individual bid and ask. The resolver 706 handles any crossed quotes (when one market maker's indicative bid price is greater than or equal to another market maker's indicative ask price) and distributes the final best indicative quote.

All options spread pricing and indicative market resolution preferably takes place within the network management system and not at end user (subscriber) workstations, thereby greatly reducing message traffic required to pass through the network as well as lessening the subscriber's processor and memory footprint for display of indicative markets.

The combination pricing module preferably uses the following methods of determining combination prices. Note that the functions "Floor" and "Ceiling" simply round the result up or down, respectively, to the nearest tick.

1) Straddle—Call and Put for the Same Strike

A. Using Fair Values for the Future Bid/Ask

Bid Price=Floor(Call Fair Value$_{Future\ Bid}$+Put Fair Value$_{Future\ Ask}$−Spread Edge+Offset)

Ask Price=Ceiling(Call Fair Value$_{Future\ Ask}$+Put Fair Value$_{Future\ Bid}$+Spread Edge+Offset)

B. Using Mid-Market Future Fair Value

Bid Price=Floor(Call Fair Value+Put Fair Value−Spread Edge+Offset)

Ask Price=Ceiling(Call Fair Value+Put Fair Value+Spread Edge+Offset)

2) Strangle—Call at One Strike, Put at a Lower Strike

A. Using Fair Values for the Future Bid/Ask

Bid Price=Floor(Put Fair Value$_{Future\ Ask}$+Call Fair Value$_{Future\ Bid}$−Spread Edge+Offset)

Ask Price=Ceiling(Put Fair Value$_{Future\ Bid}$+Call Fair Value$_{Future\ Ask}$+Spread Edge+Offset)

B. Using Mid-Market Future Fair Value

Bid Price=Floor(Call Fair Value+Put Fair Value−Spread Edge+Offset)

Ask Price=Ceiling(Call Fair Value+Put Fair Value+Spread Edge+Offset)

3) Call Vertical—Two Calls of Different Strikes

A. Using Fair Values for the Future Bid/Ask

Bid Price=Floor(Call Fair Value$_{Future\ Bid}$(Lower Strike)−Call Fair Value$_{Future\ Ask}$(Higher Strike)−Spread Edge+Offset)

Ask Price=Ceiling(Call Fair Value$_{Future\ Ask}$(Lower Strike)−Call Fair Value$_{Future\ Bid}$(Higher Strike)+Spread Edge+Offset)

B. Using Mid-Market Future Fair Value

Bid Price=Floor(Call Fair Value (Higher Strike)−Call Fair Value (Lower Strike)−Spread Edge+Offset)

Ask Price=Ceiling(Call Fair Value (Higher Strike)−Call Fair Value (Lower Strike)+Spread Edge+Offset)

4) Put Vertical—Two Puts of Different Strikes

A. Using Fair Values for the Future Bid/Ask

Bid Price=Floor(Put Fair Value$_{Future\ Ask}$(Higher Strike)−Put Fair Value$_{Future\ Bid}$(Lower Strike)−Spread Edge+Offset)

Ask Price=Ceiling(Put Fair Value$_{Future\ Bid}$(Higher Strike)−Put Fair Value$_{Future\ Ask\ (Lower\ Strike)}$+Spread Edge+Offset)

B. Using Mid-Market Future Fair Value

Bid Price=Floor(Put Fair Value (Higher Strike)−Put Fair Value (Lower Strike)−Spread Edge+Offset)

Ask Price=Ceiling(Put Fair Value (Higher Strike)−Put Fair Value (Lower Strike)+Spread Edge+Offset)

5) Call Calendar—Two Calls, Same Strike Spread Across Two Months

A. Using Fair Values for the Future Bid/Ask

Bid Price=Floor(Call Fair Value$_{Future\ Bid}$(Later Month)−Call Fair Value$_{Future\ Ask}$(Earlier Month)−Spread Edge+Offset)

Ask Price=Ceiling(Call Fair Value$_{Future\ Ask}$(Later Month)−Call Fair Value$_{Future\ Bid}$(Earlier Month)+Spread Edge+Offset)

B. Using Mid-Market Future Fair Value

Bid Price=Floor(Call Fair Value (Later Month)−Call Fair Value (Earlier Month)−Spread Edge+Offset)

Ask Price=Ceiling(Call Fair Value (Later Month)−Call Fair Value (Earlier Month)+Spread Edge+Offset)

6) Put Calendar—Two Puts, Same Strike Spread Across Two Months

A. Using Fair Values for the Future Bid/Ask

Bid Price=Floor(Put Fair Value$_{Future\ Bid}$(Later Month)−Put Fair Value$_{Future\ Ask}$(Earlier Month)−Spread Edge+Offset)

Ask Price=Ceiling(Put Fair Value$_{Future\ Ask}$(Later Month)−Put Fair Value$_{Future\ Bid}$(Earlier Month)+Spread Edge+Offset)

B. Using Mid-Market Future Fair Value

Bid Price=Floor(Call Fair Value (Later Month)+Put Fair Value (Earlier Month)−Spread Edge+Offset)

Ask Price=Ceiling(Call Fair Value (Later Month)+Put Fair Value (Earlier Month)+Spread Edge+Offset)

7) N×M Call Ratio—Buying N Calls at One Strike while Selling M Calls at Another Higher Strike A. Using Fair Values for the Future Bid/Ask Bid Price=Absolute Value [Floor(N×Call Fair Value$_{Future\ Bid}$(Higher Strike)−M×Call Fair Value$_{Future\ Bid}$ (Lower Strike)−Spread Edge+Offset)]

Ask Price=Absolute Value [Ceiling(N×Call Fair Value$_{Future\ Ask}$(Higher Strike)−M×Call Fair Value$_{Future\ Ask}$ (Lower Strike)+Spread Edge+Offset)]

B. Using Mid-Market Future Fair Value

Bid Price=Absolute Value [Floor(N×Call Fair Value (Higher Strike)−M×Call Fair Value (Lower Strike)−Spread Edge+Offset)]

Ask Price=Absolute Value [Ceiling(N×Call Fair Value (Higher Strike)−M×Call Fair Value (Lower Strike)+Spread Edge+Offset)]

8) N×M Put Ratio—Buying N Puts at One Strike While Selling M Puts at Another Higher Strike A. Using Fair Values for the Future Bid/Ask Bid Price=Absolute Value [Floor(N×Put Fair Value$_{Future\ Bid}$(Higher Strike)−M×Put Fair Value$_{Future\ Bid}$ (Lower Strike)−Spread Edge+Offset)]

Ask Price=Absolute Value [Ceiling(N×Put Fair Value$_{Future\ Ask}$(Higher Strike)−M×Put Fair Value$_{Future\ Ask}$ (Lower Strike)+Spread Edge+Offset)]

B. Using Mid-Market Future Fair Value

Bid Price=Absolute Value [Floor(N×Put Fair Value (Higher Strike)−M×Put Fair Value (Lower Strike)−Spread Edge+Offset)]

Ask Price=Absolute Value [Ceiling(N×Put Fair Value (Higher Strike)−M×Put Fair Value (Lower Strike)+Spread Edge+Offset)]

9) Call Butterfly—Buying/Selling Call at One Strike, Selling/Buying 2 Calls at a Higher Strike, Buying/Selling Call at Still Higher Strike A. Using Fair Values for the Future Bid/Ask Bid Price=Absolute Value [Floor(2×Call Fair Value$_{Future\ Bid}$(Middle Strike)−(Call Fair Value$_{Future\ Bid}$ (Lower Strike)+Call Fair Value$_{Future\ Bid}$ (Higher Strike))−Spread Edge+Offset)]

Ask Price=Absolute Value [Ceiling (2×Call Fair Value$_{Future\ Ask}$(Middle Strike)−(Call Fair Value$_{Future\ Ask}$ (Lower Strike)+Call Fair Value$_{Future\ Ask}$ (Higher Strike))−Spread Edge+Offset)]

B. Using Mid-Market Future Fair Value

Bid Price=Absolute Value [Floor(2×Call Fair Value (Middle Strike)−(Call Fair Value (Lower Strike)+Call Fair Value (Higher Strike))−Spread Edge+Offset)]

Ask Price=Absolute Value [Ceiling(2×Call Fair Value (Middle Strike)−(Call Fair Value (Lower Strike)+Call Fair Value (Higher Strike))+Spread Edge+Offset)]

10) Put Butterfly—Buying/Selling Put at One Strike, Selling/Buying 2 Put at a Higher Strike, Buying/Selling Put at Still Higher Strike A. Using Fair Values for the Future Bid/Ask Bid Price=Absolute Value [Floor (2×Put Fair Value$_{Future\ Bid}$(Middle Strike)−(Put Fair Value$_{Future\ Bid}$ (Lower Strike)+Put Fair Value$_{Future\ Bid}$ (Higher Strike))−Spread Edge+Offset)]

Ask Price=Absolute Value [Ceiling (2×Put Fair Value$_{Future\ Ask}$ (Middle Strike)−(Put Fair Value$_{Future\ Ask}$ (Lower Strike)+Put Fair Value$_{Future\ Ask}$ (Higher Strike))−Spread Edge+Offset)]

B. Using Mid-Market Future Fair Value

Bid Price=Absolute Value [Floor(2×Put Fair Value (Middle Strike)−(Put Fair Value (Lower Strike)+Put Fair Value (Higher Strike))−Spread Edge+Offset)]

Ask Price=Absolute Value [Ceiling(2×Put Fair Value (Middle Strike)−(Put Fair Value (Lower Strike)+Put Fair Value (Higher Strike))+Spread Edge+Offset)]

11) Covered—Trading an Option with a Hedge

A. Using Fair Values for the Future Bid/Ask

Bid Price=Floor(Option Fair Value$_{Future\ Bid}$−Spread Edge+Offset) in addition to 1/delta number of futures required to hedge Ask Price=Ceiling(Option Fair value$_{Future\ Ask}$+Spread Edge+Offset) in addition to (1/delta number of futures required to hedge B. Using Mid-Market Future Fair Value Bid Price=Floor(Option Fair Value−Spread Edge+Offset) in addition to 1/delta number of futures required to hedge Ask Price=Ceiling(Option Fair Value+Spread Edge+Offset) in addition to 1/delta number of futures required to hedge The market resolver 706 determines the best prices for a given contract, even if there is an indicative price cross in the market. As described above, the market makers publish indicative prices for a particular option, resulting in a group of quotes, such as:

| market maker | Bid | Ask |
| --- | --- | --- |
| MM1 | 1.20 | 1.25 |
| MM2 | 1.19 | 1.22 |
| MM3 | 1.23 | 1.27 |
| MM4 | 1.22 | 1.26 |

The resolver 706 first sorts the bid prices into descending order and the ask prices in ascending order. Cross conditions exist when the bid is greater or equal than the ask. In this example, 1.23 crosses with 1.22.

| Bid | Ask |
| --- | --- |
| 1.23 | 1.22 |
| 1.22 | 1.25 |
| 1.20 | 1.26 |
| 1.19 | 1.27 |

The Resolver 706 then searches the list and finds the first instance of a bid/ask that do not cross (bid less than the ask):

| Bid | Ask |
| --- | --- |
| ~~1.23~~ | ~~1.22~~ |
| 1.22 | 1.25 |
| 1.20 | 1.26 |
| 1.19 | 1.27 |

The resulting prices are then sent to the user. In this example a bid of 1.22 and an ask of 1.25 would be displayed.

In another embodiment, the market maker stations generate indicative quotes for structured futures products, such as those traded in the Chicago Mercantile Exchange's Eurodollar complex or the London Financial Futures Exchange's Euribor complex. These products are characterized by the trading of several futures grouped as a single transaction. These are known generically as strips, and the CME further defines them as packs and bundles. A pack, for example, is the simultaneous transfer of one contract each of four consecutive futures months. Bundles involve the transfer of one contract each of four, eight, 12, or 16 consecutive futures months. As with options, indicative quotes are generated by the market maker stations and transmitted to subscribers. Subscribers then request binding quotes, and send orders into the exchange to match against the market maker's responses to those requests.

FIG. 4C shows the "Efuture" screen, which serves as an electronic eye to obtain Bid and Ask prices for any futures. It allows the user to set the spread value that determines the value of back-month futures used to determine options spreads. If necessary, this rule can be used to manually match the front-month future price. a/c/e Bid and Ask prices can be followed or alternative Bid and Ask prices may be used.

In one embodiment of the market maker station, the market overview screen, as shown in FIG. 5A, displays both the best bid and ask (as would be displayed to the subscriber) as well as the market makers' own bid and ask. Color coding is preferably used to indicate whether the market maker's own bid (ask) is at or below (above) the best bid (ask). FIG. 5B illustrates how this information is displayed on the Quote Entry window, used by the market maker to send binding quotes into the market.

Specifically, with reference to FIG. 5B, the e-RFQ causes the market maker's terminal to display a quote ticket that includes the market maker's indicative bid 501 and ask 502, the best indicative bid 503 and ask 504 (which are preferably an aggregate quote from all market makers' indicative quotes), and may optionally include any firm or binding quotes 505, if any exist. The quote ticket preferably includes buttons to widen 506 or tighten 507 the quote, adjust the quantity 508, and move the price up 509 or down 510. As with the overview screen of FIG. 5A, color coding is preferably used: green indicates to the market maker that their indicative quotes are at the indicative best bid/offer, yellow indicates their quotes are outside the best bid/offer, while red indicates that their quotes are crossed with the best bid/offer.

In a further aspect of the trading system, an indicative quote audit function is provided. In a preferred embodiment, the system stores historical quote generation data that permits, among other things, auditing of transactions to judge whether trades are made at competitive market levels. Preferably, the trading system includes a historical quote archive database that stores historical quote generation data sufficient to re-create market makers' quotes for products at a given time, without having to store each and every quote submission. That is, for outright securities products (specific put or call contracts, at specified strike prices and dates), the historical quote generation data is sufficient to determine each market maker's prices, such as skew tables. Given the skew tables, one may determine the theoretical values and/or quotes from other information such as the price of the underlying security. In another embodiment, the historical quote generation data includes theoretical prices for outright options contracts (or data sufficient to determine theoretical prices for outright options contracts) and the market makers' associated spread parameters used in generating quotes for combination products. In an alternative embodiment, the quote archive database includes the following information that allows the reconstruction of indicative quote levels of a market maker: (i) skew parameters, which may include market maker inputs that defines the market makers' volatility levels (skew) including (but not limited to, or requiring) prices over a range of option strikes, interest rate, bid/ask spread for outright option contracts; (ii) Option Model—Black-Scholes, Whaley, etc.; (iii) spread parameters—bid/ask spread, offset and quantity for supported Option Strategies.

These levels may then be combined with levels of other market makers to resolve the best indicative quotes on the system at any time. To determine the precise indicative quote at a given time involves combining the archived market maker with an underlying future level at that given moment in time. The system also preferably stores all underlying futures price levels. Alternatively, detailed futures price levels information is retained by the Exchange and is widely available through a variety of Market Data Vendors.

In another embodiment, the market maker station is a gateway application connecting a market maker's internal network to the LD network. In this case, the functions of the market maker station are controlled by other applications running within the market maker's internal network. These applications may be trading front-ends or trading programs used to access the LD network. In this case, the LD market maker gateway provides a protocol for passing messages between the networks. These messages include receiving and responding to requests for indicative and binding quotes.

A network managing station has hardware and software to maintain a directory of participants receiving and providing quotes. The network managing station consists of hardware (for instance, Windows-based servers) that runs application software that validates and coordinates the use of the LD network. Each subscriber and market maker station connects to the network managing station for the purpose of logging in. When market makers connect, they provide a list of products that they are interested in quoting. When subscribers connect, they provide a list of products they are interested in trading. This list of products and participants is updated as users log in/out or change their product list. As this list changes, the network managing station notifies the participants. This allows each participant to respond accordingly. In one embodiment, the network managing station is not directly involved in the requesting of binding quotes, or sending quotes and orders to Exchanges, but rather monitors this activity and maintains an audit trail for review purposes. Depending upon the rules and regulations of a specific Exchange, however, the network managing station may serve as central matching utility, collecting orders and binding quotes from participants and transmitting matched trades to an Exchange for clearing.

An Exchange may be any listed Exchange or over-the-counter (OTC) entity that pluralities of LD participants agree is a suitable medium for transacting and clearing trades. An Exchange may have a central order book and regulations that require all orders to be matched on a "price-time" priority basis, or it may allow block trades to be transmitted and cleared outside of the central order book. In certain cases, an "Exchange" may consist of only a price reporting agency and a clearing house.

Those skilled in these arts will recognize a variety of system architecture, communication links, data management system and enabling software to carryout the invention. The network technology used for this invention may be Local Area (LAN), Wide Area (WAN), wireless, Internet or Intranet, or a combination of all these approaches. Message protocols may be based upon TCP/IP with additional functionality from Microsoft's Message Queue, but an XML-based protocol provides maximum flexibility and is preferred. Front-ends may include custom software programmed in Microsoft Visual Basic, Microsoft C++, and Java. Alternately a browser-based version can be implemented in HTML for platform-independent use. The market maker station users Microsoft SQL Server 7.0, but is portable to Oracle, Sybase, or SQL Server 2000. The above description is intended to illustrate the invention and not to limit it in spirit or scope.

The invention claimed is:

1. A computer implemented method for electronically trading derivative instruments comprising the steps of:
    receiving, by a network computer, a request for a binding quote for a combination of selected derivative instruments from at least one of a market maker computer or subscriber computer over a communication network;
    transmitting, by the network computer, the request for binding quote over the communication network to at least one market maker computer;
    displaying, by the network computer, to the at least one market maker via the at least one market maker's computer, the market maker's indicative quote, and a corresponding aggregate best indicative quote;
    receiving, by the network computer, a binding quote in response to the transmitted request for binding quote; and
    transmitting, by the network computer, the binding quote to the at least one of the market maker computer or subscriber computer.

2. The computer implemented method of claim 1 wherein the at least one market maker's indicative quote is displayed color-coded if the at least one market maker's indicative quote equals the corresponding aggregate best indicative quote.

3. The computer implemented method of claim 1 wherein the step of displaying to the at least one market maker the market maker's indicative quote, and the corresponding aggregate best indicative quote, includes displaying a quote ticket, wherein the quote ticket may be used for submission of a binding quote.

4. The computer implemented method of claim 1 further comprising:
    receiving, by the network computer, an indicative quote data set for a plurality of derivative instruments from at least one market maker computer of a plurality of market maker computers, the indicative quote data set operative to enable the network computer to generate non-binding quotes based thereon on behalf of the at least one market maker computer;
    receiving, by the network computer, a request for a non-binding quote for at least one of the plurality of derivative instruments from at least one of a market maker computer or subscriber computer over a communications network;
    generating, by the network computer on behalf of the at least one market maker computer from which the indicative quote data set was received, the indicative quote based on the indicative quote data set.

5. The computer implemented method of claim 4, wherein the indicative quote data set includes at least one theoretical value.

6. The computer implemented method of claim 4, wherein at least one theoretical value for use in generating the indicative quote is determined in response to the received plurality of quote data sets.

7. The computer implemented method of claim 4, wherein the step of generating indicative quote utilizes at least one spread parameter obtained from a market maker computer.

8. The computer implemented method of claim 7, wherein the at least one spread parameter includes a spread edge parameter and an offset parameter.

9. The computer implemented method of claim 4, wherein the step of generating the indicative quote is performed by a network management system of the network computer.

10. A computer implemented method for electronically trading derivative instruments comprising the steps of:
- receiving, by a network computer, a request for a binding quote for a combination of at least one option contract from at least one of a market maker computer or subscriber computer over a communication network;
- transmitting, by the network computer, the request for binding quote over the communication network to at least one market maker computer;
- displaying, by the network computer, to the at least one market maker via the at least one market maker's computer, the market maker's indicative quote for the combination, and a corresponding aggregate best indicative quote;
- receiving, by the network computer, a binding quote in response to the transmitted request for binding quote; and
- transmitting, by the network computer, the binding quote to the at least one of the market maker computer or subscriber computer.

11. The computer implemented method of claim 10 further comprising: receiving, by the network computer, at least one indicative quote data set from at least one market maker computer for a plurality of option contracts, wherein the at least one indicative quote data set comprises at least bid and ask non-binding prices for the plurality of options contracts and is further operative to enable the network computer to generate non-binding quotes on behalf of the at least one market maker computer from which the at least one indicate quote data set was received.

12. The computer implemented method of claim 11 wherein the at least one indicative quote data set further comprises an associated quantity.

13. The computer implemented method of claim 11 wherein the step of displaying the market maker's indicative quote via the at least one of the market maker computer further comprises:
- determining, by the network computer, at least one component leg of the combination;
- determining, by the network computer, at least one theoretical value of the at least one component leg;
- summing, by the network computer, the at least one theoretical value according to at least one predetermined pricing formula;
- applying, by the network computer, a spread function to the resulting summation to obtain a two sided non-binding quote; and
- transmitting, by the network computer, the two-sided non-binding quote to the at least one of the market maker computer.

14. The computer implemented method of claim 13 further comprising applying an offset function to the summation.

15. The computer implemented method of claim 13 wherein the step of determining at least one theoretical value of the at least one component leg comprises using at least one theoretical value received from at least one market maker computer.

16. A computer implemented method for electronically trading derivative instruments comprising the steps of:
- receiving, by a network computer, a request for a binding quote for a combination of at least one option contract from at least one of a market maker computer or subscriber computer over a communication network;
- receiving, by the network computer, at least one spread parameter;
- transmitting, by the network computer, the request for binding quote over the communication network to at least one market maker computer;
- displaying, by the network computer, to the at least one market maker via the at least one market maker's computer, the market maker's indicative quote for the combination and the at least one spread parameter, and a corresponding aggregate best indicative quote;
- receiving, by the network computer, a binding quote in response to the transmitted request for binding quote; and
- transmitting, by the network computer, the binding quote to the at least one of the market maker computer or subscriber computer.

17. The computer implemented method of claim 16 further comprising: receiving, by the network computer, at least one indicative quote data set from at least one market maker computer for a plurality of option contracts, wherein the at least one indicative quote data set comprises at least bid and ask non-binding prices for the plurality of options contracts and is further operative to enable the network computer to generate non-binding quotes on behalf of the at least one market maker computer from which the at least one indicate quote data set was received; and
- wherein the displaying further comprises providing, by the network computer, at least one non-binding quote to at least one of a market maker computer or subscriber computer for at least one specific combination of at least one options contract based on the received at least one indicative quote data set and the at least one spread parameter.

18. The computer implemented method of claim 17 further comprising:
- archiving, by the network computer, quote generation data used to provide the at least one non-binding quote to the at least one of the market maker computer or subscriber computer from which the at least one request for at least one binding quote was received.

19. The computer implemented method of claim 18 wherein the archived quote generation data includes at least one market maker's volatility levels.

20. The computer implemented method of claim 18 wherein the archived quote generation data includes at least one price over a range of at least one of option strikes, interest rate, days to expiration, and a bid/ask spread.

* * * * *